United States Patent
Montelo et al.

(10) Patent No.: US 7,580,862 B1
(45) Date of Patent: Aug. 25, 2009

(54) METHOD AND SYSTEM TO SELECT, SCHEDULE AND PURCHASE HOME SERVICES

(75) Inventors: Patrick A. Montelo, Schaumburg, IL (US); Peter A. Korp, Naperville, IL (US); Kurt A. Biery, Lombard, IL (US); Susan P. Buckles, Plainfield, IL (US); James A. Goetz, Wheaton, IL (US); James B. Griffin, Romeoville, IL (US); Todd M. Hibben, Montgomery, IL (US); David A. Linke, Geneva, IL (US); Timothy J. Moriarty, Batavia, IL (US); Jerome P. Mrozak, Wheaton, IL (US); James R. Schulz, Naperville, IL (US); Michael E. Shugarman, Naperville, IL (US)

(73) Assignee: The Servicemaster Company, Downers Grove, IL (US)

( * ) Notice: Subject to any disclaimer, the term of this patent is extended or adjusted under 35 U.S.C. 154(b) by 129 days.

(21) Appl. No.: 10/159,649

(22) Filed: May 31, 2002

Related U.S. Application Data

(60) Provisional application No. 60/294,905, filed on May 31, 2001.

(51) Int. Cl.
G06Q 30/00 (2006.01)
(52) U.S. Cl. .............................. 705/26; 705/1; 705/10
(58) Field of Classification Search ................... 705/26; 709/200
See application file for complete search history.

(56) References Cited

U.S. PATENT DOCUMENTS

| | | | |
|---|---|---|---|
| 5,117,353 A | 5/1992 | Stipanovich et al. | |
| 5,615,121 A | 3/1997 | Babayev et al. | |
| 5,737,728 A | 4/1998 | Sisley | |
| 5,839,117 A * | 11/1998 | Cameron et al. | ............... 705/27 |
| 5,845,255 A | 12/1998 | Mayaud | |
| 5,883,946 A * | 3/1999 | Beck et al. | ............. 379/201.12 |
| 5,898,765 A * | 4/1999 | Teglovic et al. | ............. 379/120 |
| 5,960,408 A | 9/1999 | Martin et al. | |
| 6,006,171 A | 12/1999 | Vines et al. | |
| 6,085,171 A * | 7/2000 | Leonard | ...................... 705/26 |

(Continued)

FOREIGN PATENT DOCUMENTS

| | | |
|---|---|---|
| WO | WO 00/41104 | 7/2000 |
| WO | WO 02/21373 | 3/2002 |

Primary Examiner—F. Zeender
Assistant Examiner—Asfnad M Sheikh
(74) Attorney, Agent, or Firm—Cantor Colburn LLP

(57) ABSTRACT

A method and system to select, schedule, purchase, confirm, invoice, bill and settle service orders, such as home services orders from customers. The method and system accept electronic service orders as well as customer leads for services, selects service providers and schedule services in real-time via a computer network, confirms scheduling of service delivery in real-time, handles administrative and business details for both customers and service providers, as well as fulfills, tracks and settles service orders. The method and system also provide customized information for services available via an electronic services network and dynamically schedule services using plural electronic appointment calendars from plural service providers. The method and system includes customer service order and customer lead information and enterprise-wide visibility and management of business processes. The method and system may also be used for goods.

15 Claims, 7 Drawing Sheets

U.S. PATENT DOCUMENTS

| | | | |
|---|---|---|---|
| 6,104,798 A * | 8/2000 | Lickiss et al. | 379/201.12 |
| 6,349,238 B1 * | 2/2002 | Gabbita et al. | 700/101 |
| 6,587,851 B1 | 7/2003 | Ditcharo et al. | |
| 6,598,029 B1 | 7/2003 | Johnson et al. | |
| 6,609,106 B1 | 8/2003 | Robertson | |
| 6,611,275 B1 * | 8/2003 | Zey et al. | 715/752 |
| 6,640,212 B1 | 10/2003 | Rosse | |
| 6,647,105 B1 * | 11/2003 | Gilles | 379/201.12 |
| 6,725,445 B1 * | 4/2004 | Leymann et al. | 717/101 |
| 2001/0005829 A1 * | 6/2001 | Raveis, Jr. | 705/1 |
| 2001/0027481 A1 * | 10/2001 | Whyel | 709/218 |
| 2001/0034627 A1 * | 10/2001 | Curtis et al. | 705/7 |
| 2002/0016729 A1 * | 2/2002 | Breitenbach et al. | 705/9 |
| 2002/0059587 A1 | 5/2002 | Cofano et al. | |
| 2002/0103673 A1 * | 8/2002 | Atwood | 705/2 |
| 2002/0103689 A1 * | 8/2002 | Hornick et al. | 705/9 |
| 2002/0143569 A1 | 10/2002 | Draughon | |
| 2002/0143688 A1 | 10/2002 | Truitt et al. | |
| 2003/0083889 A1 | 5/2003 | Macklin | |
| 2003/0093287 A1 | 5/2003 | Lowery | |
| 2003/0144969 A1 | 7/2003 | Coyne | |
| 2003/0154122 A1 | 8/2003 | Jackson, Jr. et al. | |
| 2003/0220812 A1 | 11/2003 | Jones | |

* cited by examiner

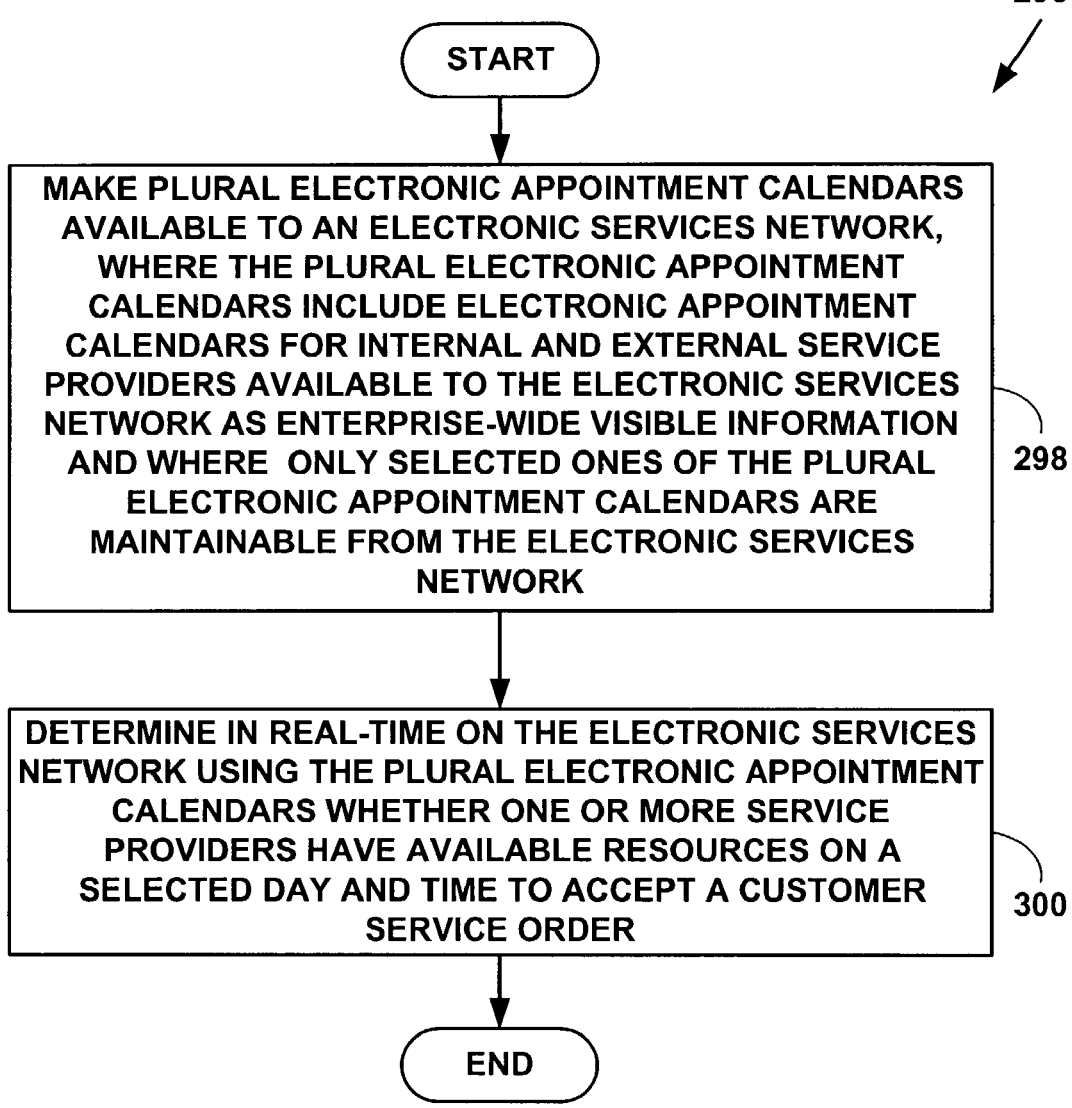

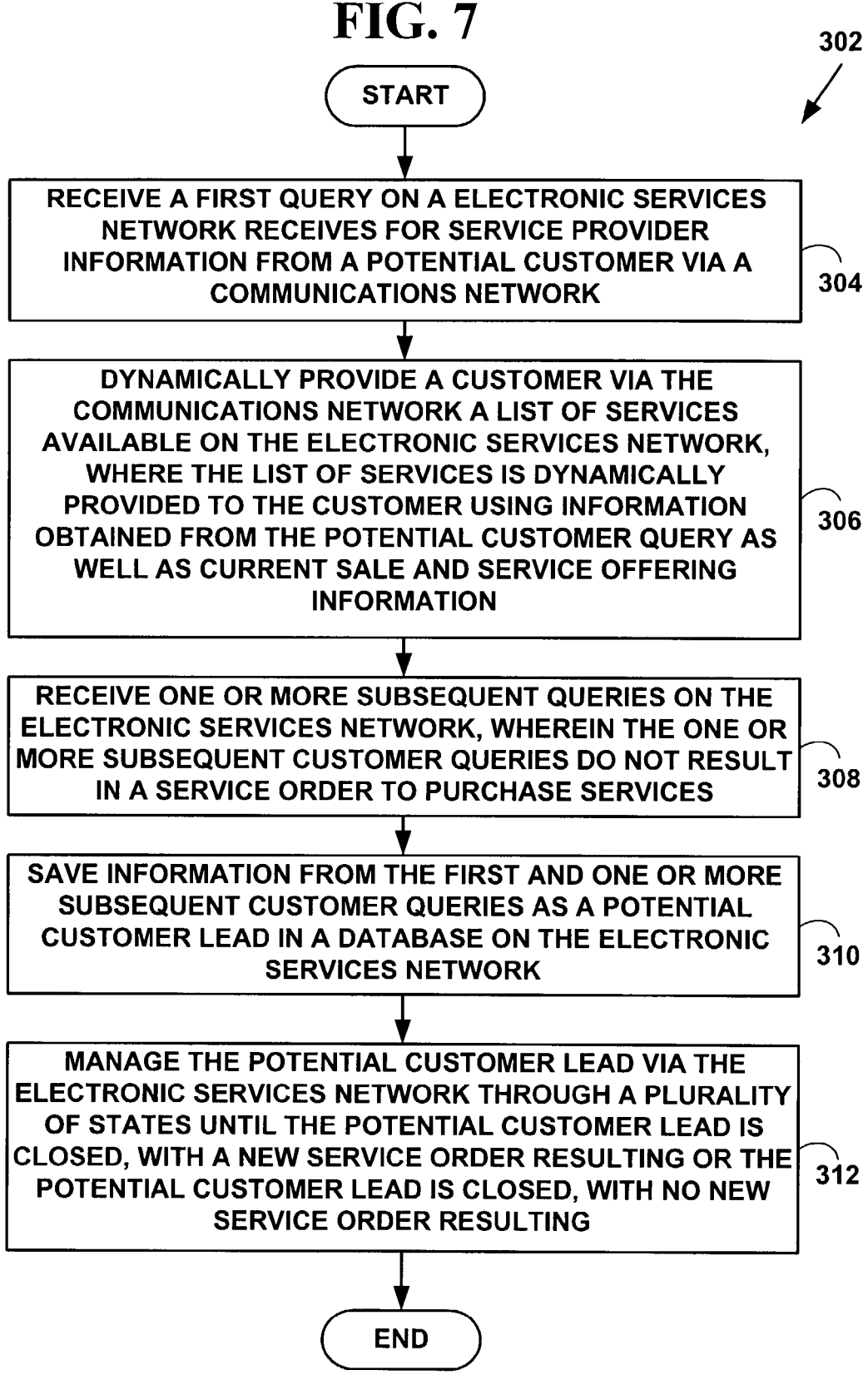

US 7,580,862 B1

METHOD AND SYSTEM TO SELECT, SCHEDULE AND PURCHASE HOME SERVICES

CROSS REFERENCES TO RELATED APPLICATIONS

This Utility application claims priority from U.S. Provisional Patent Application No. 60/294,905, filed May 31, 2001.

FIELD OF THE INVENTION

This invention relates to selecting, scheduling and purchasing services. More specifically, it relates to a method and system to select, schedule, purchase, fulfill, track and settle home services.

BACKGROUND OF THE INVENTION

Customers are presented with many choices when it comes to scheduling home services. For example, a customer may desire to schedule air conditioning repair, air conditioning tune-up, appliance repair, carpet cleaning, electrical repair, furniture refinishing, furniture repair, handyman solutions, heating system repair, heating system tune-up, home energy analysis, home inspection, home security, home service plans, home warranty, lawn fertilization, maid service, pest control, plumbing, special occasion cleaning, termite protection, tree and shrub fertilization, upholstery cleaning, water delivery or other home services.

There are many problems associated with scheduling such home services. One problem is that most home service providers are only referral services, providing customers with the names of only local providers and then handing off the customer to only those providers.

Another problem is that most home service providers do not assume responsibility for customer satisfaction. To deliver consistent quality, a home service scheduler should accept some responsibility for service delivery.

Another problem is that home service schedulers typically do not offer the ability to book leading national service providers ensuring dependability, confidence, and broad geographic coverage.

Another problem is that most customers are finding it increasingly challenging to obtain qualified, reliable service providers.

Another problem is that most home service schedulers do not help their service providers automate critical scheduling, invoicing, and administrative functions to improve customer service and business management.

Another problem is that many home service schedulers do not allow home services to be scheduled in real-time via a computer network like the Internet, an intranet or the public telephone network.

Another problem is that many home service schedulers do not allow home services to be scheduled if a customer does not have access to a computer and the Internet.

Another problem is that many home service providers do not allow home service appointments to be confirmed if a customer does not have access to a computer and the Internet.

Another problem is that many home service providers cannot provide the customer any visibility into where a given service provider's technicians are, what type of work they are capable of doing and when they actually will arrive at the customer's residence.

Another problem is that home service schedulers don't have any way to monitor or orchestrate an entire chain of events that occur in disparate business process flow throughout all internal and external organizations involved in the sales and delivery of home services.

Thus, it is desirable to provide a home service scheduler to accept service orders and schedule services in real-time via a computer network, confirm scheduling of service delivery, handle administrative and business details for both customers and service providers, as well as fulfill, track and settle service orders.

SUMMARY OF THE INVENTION

In accordance with preferred embodiments of the present invention, some of the problems associated with ordering home services are overcome. A method and system to select, schedule, purchase, track, fulfill, invoice and settle home services are presented.

One aspect of the invention includes an electronic services network system architecture. Another aspect of the invention includes a method for initiating services via the electronic services network. Another aspect of the invention includes a method for confirming performance of services via the electronic services network. Another aspect of the invention includes a method for selecting a set of service providers in real-time to perform a service initiated by a service order. Another aspect of the invention includes a method for dynamically scheduling services via the electronic services network using plural electronic appointment calendars from plural service providers. Another aspect of the invention includes a method for providing customized information for services available via the electronic services network. Another aspect of the invention includes a method for collecting customer lead information via an electronic services network.

The method and system may help improve the selection, scheduling, purchasing, confirmation, invoicing, billing and settlement of service orders from customers. However, the present invention is not limited to services and the present invention can also be used to perform the same tasks with respect to goods.

BRIEF DESCRIPTION OF THE DRAWINGS

Preferred embodiments of the present invention are described with reference to the following drawings, wherein:

FIG. 6 is a flow diagram illustrating a method for dynamically scheduling services via an electronic services network; and FIG. 7 is a flow diagram illustrating a method for collecting customer lead information via an electronic services network.

DETAILED DESCRIPTION OF PREFERRED EMBODIMENTS

Exemplary Electronic Services Network Architecture

Figure 1:
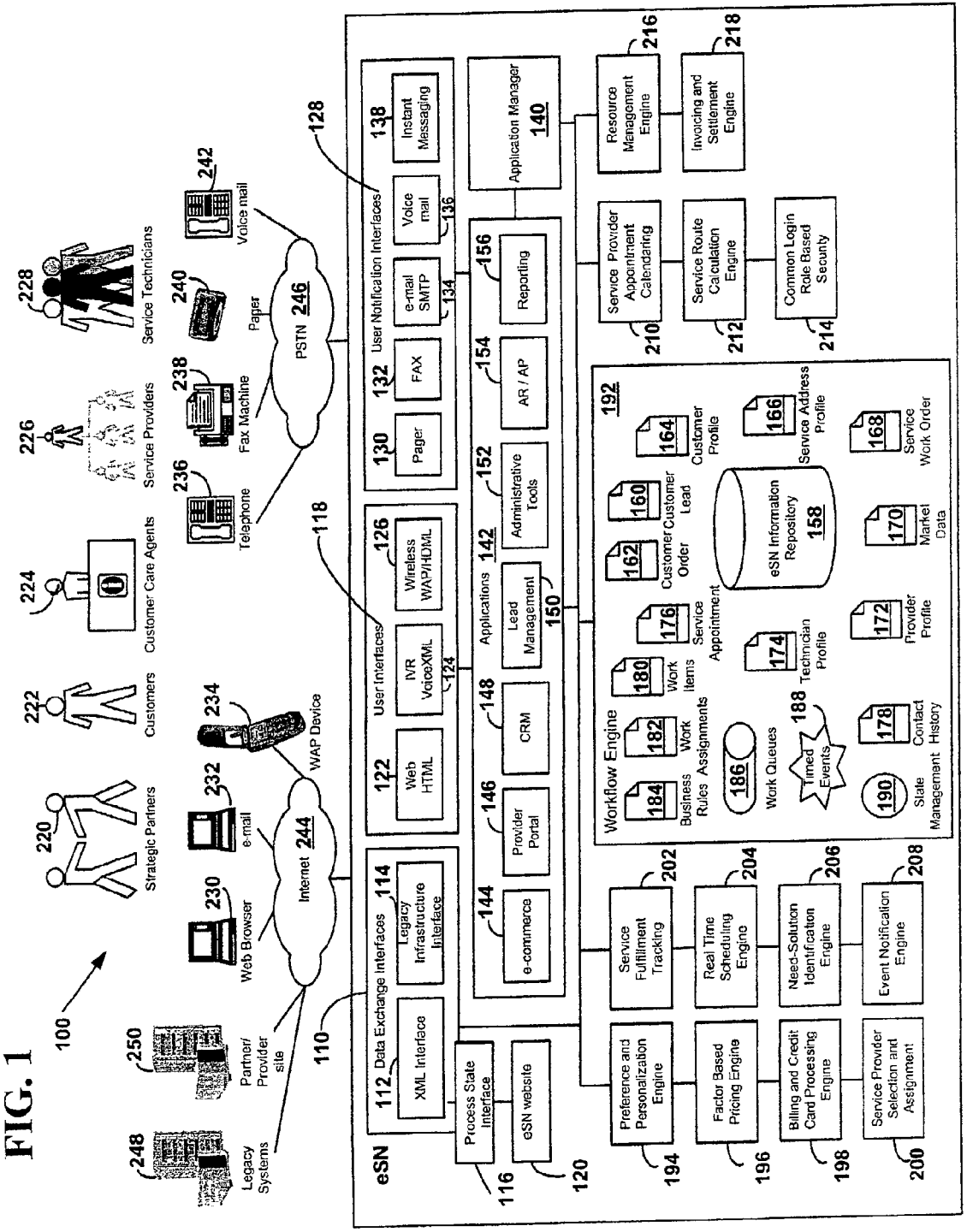
FIG. 1 is a block diagram illustrating an electronic services network system architecture.

FIG. 1 is a block diagram illustrating an electronic services network system architecture ("eSN") 100. The eSN 100 comprises plural components including plural Data Exchange Interfaces, plural User Interfaces, plural User Notification Interfaces, an Application Manager, plural Applications, plural Engines, and an Information Repository. The components of the eSN 100 reside on one or more devices such as computers, servers, communication devices, gateways, routers and other types of devices. However, the present invention is not limited to the components described and more or fewer components can also be used.

The eSN 100 allows providers of goods and services to make offers for such goods and services, and the real-time scheduling thereof, available to users via a variety of different communication technologies. As is known in the art, "real-time" refers to a period of time that allows a user to send and receive data during an actual time that it takes to complete a desired task. Hereinafter, the present invention will be described with respect to services only. However, the present invention is not limited to services and the present invention can also be used for virtually any type of goods as well.

An operating environment for the plural devices of the eSN 100 on which the eSN components reside includes a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals or biological signals by the CPU or processor. An electrical system or biological system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Data Exchange Interfaces

The eSN 100 includes plural Data Exchange Interfaces 110. The plural Data Exchange Interfaces 110 allow the eSN 100 to exchange data with partners. "Partners" include, but are not limited to, service providers who provide services to customers, and marketing organizations, outbound telemarketing organizations, quality organizations, retail channel organizations, call center organizations, data exchange (e.g., Business-to-Business ("B2B")) organizations, and other types of organizations who may, but typically do not directly provide services to customers.

The plural Data Exchange Interfaces 110 include, but are not limited to, one or more Date Exchange eXtensible Markup Language ("XML") Interfaces 112, one or more Legacy Infrastructure Interfaces 114 and a Process State Transition Interface 116. However, the present invention is not limited to such an embodiment and more, fewer or other types of Data Exchange Interfaces 110 can also be used with the eSN 100 to practice the invention.

The one or more Data Exchange XML Interfaces 112 (hereinafter Data Exchange XML Interfaces 112) allow the eSN 100 to exchange data using XML. As is known in the art, XML is a mark-up language designed especially to handle data for electronic documents. It allows designers to create their own customized data tags, enabling the definition, transmission, validation, and interpretation of data between applications and between organizations. More information on XML is available from the World Wide Web Consortium ("W3C"). As is known in the art, the W3C assists in the development of interoperable technologies and standards including specifications, guidelines, software, and tools for the Internet. For more information on XML see "Extensible Markup Language (XML) 1.0," W3C Recommendation 10 Feb. 1998, REC-xml-19980210, and "XML 1.1," W3C Working Draft 25 Apr. 2002, WD-xml11-20020425, both of which are incorporated herein by reference. These documents can be obtained electronically on the Internet at the Uniform Resource Locator ("URL") "www.w3c.org."

However, the present invention is not limited to XML Interfaces and other types of Data Exchange Interfaces can also be used (e.g., Hyper Text Markup Language ("HTML"), Wireless Markup Language ("WML"), compact HTML ("cHTML"), other mark-up and other non mark-up languages, binary protocols including customer binary protocols, and other data protocols).

The Data Exchange XML Interfaces 112 are Interfaces through which data is exchanged between partner sites 250 and the eSN 100. Partner sites 250 are sites external to the eSN 100, and include organizations or subsidiaries owned by the deployers of the eSN 100 (e.g., owned by ServiceMaster) or partners that cooperate with, but are not owned by the deployers of the eSN 100. The partner sites 250 include, but are not limited to, partner sites, partner legacy systems and other types of partner systems including computerized systems and non-computerized systems (e.g., fax machines and telephones, etc.) The Data Exchange XML Interfaces 112 facilitate transactions with partner sites 250 and legacy data processing infrastructures 248.

Sales data collected on a partner's site 250 and received from a partner can automatically be used to generate a lead, sign-up a new user, process an order, etc. in the eSN 100. A "lead" is an expression of an interest in a service. An "order" is an agreement to purchase a selected service. An order can be an informal agreement, or a contractual agreement. Partners can also request a list of available services, a price for a service, available appointment times, and schedule appointments in real-time via the eSN 100 using the Data Exchange XML Interfaces 112.

The Data Exchange XML Interfaces 112 allow relationships with partners to be maintained and allow services provided via the eSN 100 to marketed through individual partner's sites 250. Data obtained via the Data Exchange XML Interfaces 112 allows the eSN 100 to record transactions in a centralized Information Repository 158. This helps avoid duplicate data entry and manual database uploads from the partners. The Data Exchange XML Interfaces 112 also allow customers to order and schedule services delivery available from partners in real-time.

The Data Exchange XML Interfaces 112 also feeds data requests and responses into the eSN Information Repository 158 from other components of the eSN system. This Interface interacts with a Preference and Personalization Engine 194 when a customer changes preferences or customer data via partner sites 250. This Interface may, but is not limited to, read from and/or write to eSN 100 applications, documents and engines, described below.

The one or more Legacy Infrastructure Interfaces 114 (hereinafter Legacy Infrastructure Interfaces 114) enable communications with internal and external partner brands and branches. This Interface also enables communications with providers of legacy data processing systems 248, such as mainframe computers, mini-computers, etc.

A "brand" identifies an organization that provides a service. An "internal brand" is a service known to the public that is owned or controlled internally by the organization deploying the eSN 100 (e.g., ServiceMaster). An "external brand" is a service known to the public that is not owned or controlled internally by the organization deploying the eSN 100 (e.g., Sears). A "branch" is a separate but dependant part of a central organization.

The legacy data processing systems 248, include but are not limited to, mainframe computers, mini-computers, etc. and other larger data processing systems that communicate with the eSN 100 using data protocols such as the System Network Architecture ("SNA") protocol. As is known in the art, SNA is a set of network protocols originally designed in 1970's for by IBM for mainframe computers. The SNA protocol set may include Advanced Program-to-Program Communications ("APPC") protocol, Synchronous Data Link Control ("SDLC") protocol and other similar protocols used to communicate with mainframes, mini-computers, and other larger computing devices.

The legacy data processing systems 248 also include, but are not limited to, legacy systems using protocols from the Internet Suite of protocols including Transmission Control Protocol ("TCP"), User Datagram Protocol ("UDP"), Internet Protocol ("IP"), Simple Mail Transfer Protocol ("SMTP"), Hyper Text Transfer Protocol ("HTTP"), and other Internet Protocol Suite protocols, File Transfer Protocol ("FTP"), Web Methods, MQ-Series and other types of legacy data processing systems.

A partner can electronically send the eSN 100 a file downloaded from a mainframe or other computers or communications device that includes lead or order information that were entered outside the eSN 100. The Legacy Infrastructure Interfaces 114 enable data to be uploaded into the Information Repository 158. The Legacy Infrastructure Interfaces 114 also enable data to be downloaded from the Information Repository 158 back to the partner systems to update order and lead information into brand, branch, and partner legacy systems 248.

The Legacy Infrastructure Interfaces 114 allow the eSN 100 to connect to disparate legacy systems 248. The Legacy Infrastructure Interfaces 114 also synchronize new lead data and order data between the eSN Information Repository 158 and internal and external partner brands, branches and partner local data repositories. This helps create an enterprise-wide collection of all known leads, orders and transactions. A "transaction" is data (e.g., a lead, order, etc.) that is accepted, processed and managed to a desired completion state.

The Process State Transition Interface 116 provides an external communication mechanism to synchronize workflow process state transitions between an eSN Process Workflow Engine 192 and legacy workflow systems in internal and external partner brands, and branches. The Process State Transition Interface 116 allows external systems to record their local process state transitions into the eSN Information Repository 158.

The centralized eSN workflow information provides enterprise-wide visibility and management of business processes through the eSN 100 workflow platform. The Information Repository 158 also provides the same type of visibility. The centralized workflow provides enforcement of rules that exist within a given state in the eSN 100.

The Process State Transition Interface 116 provides visibility into and control over external workflow sub-processes and provides a migration path from legacy system applications to eSN 100 Applications 142.

User Interfaces

Plural User Interfaces 118 allow the eSN 100 to communicate with users via a variety of user devices, including but not limited to, desktop computers, laptop computers, personal digital assistants ("PDAs"), mobile phones, one and two-way pagers, wired phones, fax machines, and other user devices. The plural User Interfaces 118 include an eSN website 120, plural Web/Hyper Text Markup Language ("HTML") Interfaces 122, plural Interactive Voice Response ("IVR")/VoiceXML Interfaces 124, and plural Wireless/Wireless Application Protocol ("WAP")/Handheld Device Mark-up Language ("HDML") Interfaces 126. However, the present invention is not limited to these User Interfaces and more, fewer or other types of User Interfaces can also be used.

The eSN website 120 (e.g., for ServiceMaster at servicemaster.com, for WeServeHomes at wsh.com, etc.) provides direct access to the eSN 100 for customers. It is a direct point of entry to the eSN 100. The eSN website 120 includes, but is not limited to Data Exchange XML Interfaces 112, Legacy Infrastructure Interfaces 114, and the Process State Transition Interface 116. The eSN website 120 may include and use, but is not limited to, the other User Interfaces 122-126 as well.

The Web/HTML Interfaces 122 include a minimum of a HTML Interface and a HTTP Interface. However, the Web/HTML Interfaces 122 typically include additional protocols from the Internet Suite of protocols including TCP, UDP, IP, SMTP and other Internet Protocol Suite protocols.

As is known in the art, HTML is a markup language that defines the structure and layout of an electronic document by using a variety of mark-up tags and attributes. For more information on HTML, see Internet Engineering Task Force ("IETF") Request for Comments ("RFC")-1866, incorporated herein by reference. IETF RFCs can be found on the Internet at the URL "www.ietforg."

As is known in the art, HTTP is an underlying data transmission protocol used on the Internet and the World Wide Web. HTTP defines how information messages are formatted and transmitted. For more information on HTTP, see IETF RFC-2616, incorporated herein by reference.

The Web/HTML Interfaces 122 provide access to the eSN Applications 142 via the Internet 244, the Public Switch Telephone Network 246 and other wireless and wired networks. The Web/HTML Interfaces 122 provide interfaces to partner sites 250 and eSN Applications 142 including, but not limited to, E-Commerce 144, Provider Portal 146, Customer Resource Management ("CRM") 148, Lead Management

150 Administrative Tools 152, Accounts Receivable ("AR")/ Accounts Payable ("AP") 154, Reporting 156 and other eSN Applications 142.

The Web/HTML Interfaces 122 also provide a common Internet interface that is familiar to a Internet and World Wide Web users, including customers, partners, business managers, business analysts, sales agents, call center agents, etc. that is deployed centrally and provides easy access from anywhere in the world.

The IVR/VoiceXML Interfaces 124 (hereinafter IVR Interfaces 124) provide a voice interface into the eSN Applications 142. As is known in the art, VoiceXML is a technology that allows a user to interact with the electronic information through voice-recognition technology. Instead of a traditional browser that relies on a combination of HTML documents, a keyboard and a mouse, VoiceXML relies on a voice browser and/or a telephonic device. Using VoiceXML, the user interacts with voice browser by listening to audio output that is either pre-recorded or computer-synthesized and submitting audio input through the user's natural speaking voice or through a keypad, such as a telephonic keypad.

For more information on VoiceXML see "The Voice Extensible Markup Language (VoiceXML) Version 2.0," W3C Working Draft, 23 Oct. 2001, WD-voicexml20-20011023, incorporated herein by reference. W3C documents are available at the URL "www.w3c.org."

A customer, call center agent, partner, or technician can access the eSN 100 via the IVR Interfaces 124 through virtually any type of telephonic device, wired and wireless, including standard Plain Old Telephone Service ("POTS") telephones.

For example, the IVR Interfaces 124 allow service providers to perform provider website tasks when they are away from their provider computers. The IVR Interfaces 124 use natural language speech recognition and touch-tone detection for user input and outputs dynamically generated VoiceXML to create sentences using a combination of wave files, speech-to-text and text-to-speech files. These features allow the eSN 100 via the IVR Interfaces 124 to be accessible from any standard phone.

For example, partners using the IVR Interfaces 124 can accept/decline work orders, access and edit work order details, change their work order scheduling and notification methods or assign workers to work orders. The IVR Interfaces 124 also allow customers who do not have access to a computer to use eSN Applications 142. They also allow partners to accept orders within a required time frame, even when they are away from their home offices.

The wireless/WAP/HDML Interfaces 126 provide access to the eSN 100 from a variety of wireless devices. These Interfaces allow a variety of different wireless protocols including, but not limited to, Cellular Digital Packet Data ("CDPD"), Code Division Multiple Access ("CDMA"), Global System for Mobile Communications, ("GSM"), Personal Communications System ("PCS"), General Packet Radio Services ("GPRS"), Time Divisional Multiple Access ("TDMA"), analog cellular and other wireless networking protocols.

As is known in the art, WAP is a protocol specification that allows users to access electronic information via handheld wireless devices such as mobile phones, PDAs, one and two-way pagers, two-way radios, etc. WAP devices typically use microbrowsers that can accommodate the low memory constraints of handheld devices and the low-bandwidth constraints of a wireless-handheld network.

Although WAP supports HTML and XML, the WML language is typically used with WAP. WML was specifically devised for small screens and one-hand navigation without a keyboard. WML is typically scalable from one or two-line text displays up through large graphical screens found on smart phones and other larger devices. WAP also supports WMLScript. It is similar to JavaScript, but makes minimal demands on memory and CPU power because it does not contain many of the unnecessary functions found in other scripting languages.

For more information on WAP, see "Wireless Application Protocol Architecture Specification," WAP-210-WAPArch-20010712-a, incorporated herein by reference. WAP documents can be found at the URL "www.wapforum.org."

As is known in the art, HDML is a markup language supported by the W3C and used to format content for Web-enabled mobile phones. For more information on HDML, see the W3C document "Handheld Device Markup Language Specification, 9 May 1997, NOTE-Submission-HDML-spec.html," incorporated herein by reference.

Using the wireless/WAP/HDML Interfaces 126 allows partners to perform tasks from a handheld device such as a mobile phone or PDA while away from their partner computers. Providers and their technicians can view customer and work order information while on the job site, and receive additional work order assignments while in route to existing work order assignments and submit information to the eSN 100 when a service is performed or a good is delivered.

The wireless/WAP/HDML Interfaces 126 also enable customers who do not have access to a computer, but have access to a wireless device, to use the eSN 100. This interface thereby provides remote data entry and data display capabilities that allow more data intensive tasks to be performed remotely and allows for instantaneous updates of process workflow states allowing good and service delivery progress to be tracked in real-time.

The User Interfaces 122-126 allow new applications to be pushed onto remote handhelds that interface with eSN 100 workflow information. The User Interfaces 122-126 also help provide enterprise-wide visibility and management of business processes through the eSN 100 workflow platform User Notification Interfaces The plural User Notification Interfaces 128 allow the eSN 100 to supply a user with data and information via a variety of notification technologies. The User Notification Interfaces 128 include, but are not limited to, a One or Two-Way Pagers 130, a Facsimile ("fax") Interface 132, an Electronic Mail ("e-mail") Interface 134, various types of Voice Mail Interfaces 136, and Instant-Messaging ("IM") Interfaces 138. However, the present invention is not limited to these user Notification Interfaces and more, fewer or other types of User Notification Interfaces can also be used.

The plural User Notification Interfaces 128 alert users to events that require an immediate response. They provide the ability to deliver notifications to users via a variety of end-user devices including pager, fax, e-mail using SMTP, Post Office Protocol ("POP") and other e-mail protocols, voice mail, and instant-messaging.

As is known in the art, instant-messaging (also called IMing) is the ability to exchange messages instantly and in real-time with other users (e.g., "buddies") connected to the same messaging system. Instant-messaging differs from ordinary e-mail in the real-time immediacy of the message exchange and also makes a continued exchange simpler than sending e-mail back and forth. Most instant-message exchanges are text-only. However, some instant-messaging services allow attachments.

The Instant-Messaging Interfaces 138 include IETF Instant Messaging Presence Protocol ("IMPP"), Session Initiation Protocol ("SIP"), SIP for Instant Messaging and Presence Leveraging ("SIMPLE"), a Common Presence and Instant Messaging ("CPIM") or other standard instant-messaging protocols. The Instant-Messaging Interfaces 138 may also include proprietary Instant-Messaging protocols such as a RVP or America On-Line ("AOL") Instant Messenger ("AIM") related protocols, or other proprietary Instant-Messaging protocols. RVP is a presence and Instant-Messaging protocol by Microsoft Corporation of Redmond, Wash. AOL AIM is an Instant-Messaging protocol used by AOL subscribers of AOL, a Time-Warner Corporation.

For more information in on IMPP, see IETF RFCs-2778 and 2779, incorporated by reference. For more information on SIP, see IETF RFC-2543, incorporated by reference. For information in SIMPLE, see IETF drafts "Session Initiation Protocol (SIP) Extensions for Presence," draft-ietf-simple-presence-07.txt, and "Session Initiation Protocol Extension for Instant Messaging," draft-ietf-sip-message-04, incorporated herein by reference. For more information on CPIM see IETF draft "Common Presence and Instant Messaging," draft-ietf-impp-cpim-02, incorporated herein by reference. For more information on RVP, see "www.microsoft.com." For more information on AOL AIM, see "www.aol.com"

The User Notification Interfaces 128 tailor the message content to match the delivery mechanism. For example, the message content for a mobile phone with a limited display would be different than message content for a fax message.

Although called a "User Interface," the User Notification Interfaces 128 are also used to send e-mail, pager, fax, instant-messaging, etc. information to notify providers of services of new work orders and new leads. The User Notification Interfaces 128 allow the notifications to include specific details about a work item or a lead (e.g., please use the back door, watch out for the dog in the front yard, etc). The User Notification Interfaces 128 also allow for timely notifications of new work items, scheduling changes to be delivered to service technicians while en-route to a job, alerting a call center agent of an urgent task or work item, allow users to be virtually anywhere and still receive notification, allow user to choose how they will be notified and allow user to change notification methods at any time to accommodate their lifestyle.

The eSN Applications 142 can use the plural User Notification Interfaces 128 to send alerts to users, customers, partners, etc. For example, customers can receive work order confirmations via e-mail. They can also receive them by phone, voice mail, fax, pager, or instant-messaging, etc.

Application Manager

The eSN Application Manager 140 provides a common entry point for eSN 100 applications. The Application Manager 140 also serves as a central location, default location, or "home page" for a variety of internal and external services network users including, but not limited to, customers, call center agents, sales agents, enterprise managers, branch managers, business analysts, and others. It also provides a common user login and password for eSN Applications 142 it manages and provides access to.

The Application Manager 140 provides users with a dynamically generated menu of eSN Applications 142 based on security rights and limits access to only the applications customers and partners have the right to use. The Application Manager 140 provides a common enterprise login and password for users allowing a user to use eSN Applications 142 with one login and one password, thereby avoiding multiple logins and passwords per user. The Application Manager 140 also provides administrators with central maintenance of user accounts, group accounts, security rights, and rights to group mapping for eSN Applications 142. The Application Manager 140 also provides a set of tools, object-oriented classes and object-oriented frameworks for accessing various parts of the eSN 100 that it helps integrate.

Applications

The eSN 100 includes plural support Applications 142 that are managed by the Application Manager 140. The plural Applications 142 include, but are not limited to, E-Commerce 144, Provider Portal 146, CRM 148, Lead Management 150, Administrative Tools 152, AR/AP 154, Reporting 156 and other types of applications. However, the present invention is not limited to these applications, and more, fewer or other types of applications can also be used.

The E-Commerce Application 144 provides functionality to conduct electronic commerce transactions for the sales of services. The Provider Portal Application 146 provides functionality to serve and process information for partners' services. The CRM Application 148 provides customer relation management functionality. The Lead Management Application 150 includes functionality to manage and follow-up on leads that could turn into potential sales of services.

The Administrative Tools Applications 152 provide functionality to allow the Application Manager 140 to help manage the plural eSN Applications 142. The AR/AP Applications 154 provide accounting functionality. The Reporting Applications 156 provide functionality to produce various types of reports, including accounting, lead management, sales of services, etc.

Information Repository

The eSN Information Repository 158 is a customized database that the eSN 100 uses to store and retrieve information. The repository is based on plural electronic data sets called "documents." The plural electronic data sets include, but are not limited to, Customer Leads 160, Customer Orders 162, Customer Profiles 164, Service Address Profiles 166, Service Work Orders 168, Market Data 170, Provider Profiles 172, Technician Profiles 174, Service Appointments 176, Customer Contacts 178, Work Items 180, Work Assignments 182 and Business Rules 184. The Information Repository 158 also interacts with Work Queues 186, Real-Time Timed Events 188 and State Management Rules 190. However, the present invention is not limited to these plural electronic data sets, and more, fewer or other types of data sets can also be used.

The Customer Leads 160 include information about potential customers for services provided by the eSN 100 and partners such as name, address, e-mail address, telephone number, fax number, reason for visiting the eSN 100, etc. The Customer Orders 162 include information about orders that were placed by customers such as name, address, telephone number, credit/debit card number, delivery preferences for goods, appointment preferences for services, etc. The Customer Profiles 164 include customer information, such as name address, etc., and customer preferences, such as schedule a house cleaner to come to my house every Thursday between 1:00 p.m. and 3:00 p.m.

The Service Address Profiles 166 include information for providing a selected service such as beware of the dog in the back yard, please use the side door, do not apply fertilizer after 3:00 p.m. because of the children returning from school, etc. The Service Work Orders 168 include information about the services to be performed including the customer information, service provider information, cost information, service start and completion information, etc.

The Market Data 170 includes information about current market, current market trends, demographic and population information, etc. for the services being provided. The Provider Profiles 172 include information about the service providers including number of personnel, hours of operation, geographic area of operation, etc.

The Technician Profiles 174 include information about individual technicians that provide services including, this person can apply extermination chemicals and liquid lawn fertilizer, this person will not wash floors or windows, this person can fix air conditioners and furnaces. The Service Appointments 176 include information relating to scheduling of appointments for services including time, date, service, etc.

The Customer Contacts 178 include customer history information. The Work Items 180 include information about the service work to be performed such as cleaning, applying fertilizer, applying extermination chemicals, etc. The Work Assignments 182 include information about what assignments the personnel who provide services will perform, on what day, at what time, in what location, etc.

The Business Rules 184 include general business and e-commerce business rules that are used with the eSN 100 and by other service providers. The Business Rules 184 also include workflow processing rules that are used to process orders and leads through various states from generation to completion. The Business Rules 184 also include accounting rules, employment rules, tax rules, regulatory rules, etc.

The Information Repository 158 also interacts with Work Queues 186, Real-Time Timed Events 188 and State Management Rules 190. The Work Queues 186 include scheduled and queued events for services that are pending and/or in progress. The Real-Time Timed Events 188 include events that must be scheduled and completed within a specific window of time.

The State Management Rules 190 include rules used by the Process State Transition Interface 116 to provide an external communication mechanism to synchronize workflow process state transitions between the eSN Workflow Engine 192 and legacy workflow systems in internal and partners, brands, and branches. The workflow process state transitions include Customer Lead 160 or Customer Order 162 state transitions.

eSN Engines

The eSN 100 includes plural functional engines. The plural functional engines include, but are not limited to, a Workflow Engine 192, a Preference and Personalization Engine 194, Factor Based Pricing Engine 196, Billing and Credit Card Processing Engine 198, Service Provider Selection and Assignment Engine 200, Service Fulfillment Tracking Engine 202, Real-Time Scheduling Engine 204, Needs-Solution Identification Engine 206, Event Notification Engine 208, Service Provider Appointment Calendaring Engine 210, Service Route Calculation Engine 212, Common Login Role Base Security Engine 214, Resource Management Engine 216, and Invoicing and Settlement Engine 218. However, the present invention is not limited to these engines, and more, fewer or other types of applications can also be used.

Workflow Engine

The Workflow Engine 192 provides a platform for building workflow (e.g., business process automation) applications. Workflow applications are used to automate specific business processes, for example, lead management, contact management, and customer relationship management, etc. This engine also provides integration between the eSN 100 and external workflow and legacy systems 248 in partner brands and branches.

The Process State Transition Interface 116 in combination with the Workflow Engine 192 allow external systems to record their local process state transitions into the eSN Information Repository 158. The Workflow Engine 192 also provides a common application framework for accessing orders, assignments, queues, views, and histories.

The enterprise wide process visibility and statistics provided by the Workflow Engine 192 provide a mechanism to monitor and drive improvements in key customer satisfaction metrics including: (1) time to bid (e.g., customer gets a quote for service); (2) time to first service delivery (e.g., customer receives the service); and (3) time to problem resolution (e.g., customer's need is fulfilled).

The centralized workflow information managed by the Workflow Engine 192 also provides enterprise-wide visibility and management of all business processes. The Workflow Engine 192 enforces Business Rules 184 to help ensure a uniform quality-of-service ("QoS") and it allows statistical information to be gathered and analyzed to improve business processes to allow a quality organization to intervene in business process to further improve quality of service, service delivery, speed of service, etc.

The Workflow Engine 192 also helps speed the implementation of workflow applications, and provides a complete history of business process state transitions. It also helps track a workflow history for users of the eSN 100 infrastructure.

Preference and Personalization Engine

The Preference and Personalization Engine 194 provides the ability to determine geographical, historical, and service preference information about customers. This engine is designed for maximum flexibility when changing and/or creating Preference and Personalization rules.

The Preference and Personalization Engine 194 provides the ability to specify different types of Personalization content for the various customers and partners of the eSN 100. This engine uses pre-defined rules and the customer's service address, purchase history, lead history and current interests to determine the most appropriate content for the customer's needs. This engine also uses templates, text, and images to dynamically build content appropriate for the current time of year and weather conditions.

Examples of Personalization as applied to targeted marketing campaigns include: (1) In December, a lawn care advertisement will be shown to a customer who lives in Florida but not to a customer who lives in Minnesota; and (2) Geographical history has shown that a geographic area for a customer is susceptible to swarming of pests such as termites at certain times of the year. An extermination advertisement will be shown to a customer who lives in such a geographic area.

Personalization can target specific services to specific customers. The Preference and Personalization Engine 194 allows for electronic and automatic mailing of targeted marketing campaigns to improve sales results, focuses the presentation of information so it is applicable to a specific customer's needs and interests, and simplifies the implementation and maintenance of complex customer marketing and e-commerce presentations.

Factor-Based Pricing Engine

The Factor-based Pricing Engine 196 determines the price of a service at the time of the sale of services based on the pricing factors known at that time. Pricing factors are a combination of dynamic and static factors such as regional pricing differences, market pricing differences, regulation pricing differences (i.e., legal regulations from different levels of government, chemical transport regulations, etc.), tax pricing differences, partner pricing, promotion codes, or co-branded site pricing.

For example, when pricing maid services, the number of bedrooms, the number of bathrooms, and the customer's ZIP code are factors commonly used to determine a quoted price for services. When pricing lawn fertilization services, the size of a lawn, the local, state and federal chemical transport regulations, local, state and federal taxes on lawn chemicals, and the customer's ZIP code are common pricing factors, for example. Such pricing factors can also adjust for variations in the service, such as first time in, weekly, and biweekly, time of year, business of the service provider or for regions within the market.

The Factor-based Pricing Engine 196 provides flexibility in pricing so a market can have multiple pricing regions, allows for easier pricing changes, reduces the amount of data being stored in the Information Repository 158 and allows prices to be set dynamically based on Business Rules 184 (rather than statically selected from a table).

Billing and Credit Card Processing Engine

The Billing and Credit Card Processing Engine 198 provides a dynamic and flexible mechanism for managing customer and partner payments. The customer selects their payment method (e.g., pay the ServiceMaster Home Service Center with a credit/debit card or pay the partner with cash or check when service is performed). However, the eSN 100 infrastructure provides the flexibility to allow the customer to change their payment method at the time service is performed. This flexibility is accomplished by integrating billing information between a partner site 250 and the eSN 100.

The Billing and Credit Card Process Engine 198 also automates the verification of a customer's credit/debit card. It returns information when the credit/debit card fails authorization that enables A/R Applications 154 to troubleshoot issues, and provides integration into the A/R accounting system using automated batch files.

The Billing and Credit Card Process Engine 198 also allows flexibility in selecting a payment method, allows changes in the payment method at the time service is performed, automates the verification, authorizing, and charging of a customer's credit/debit card, provides a User Interface to resolve credit card issues and provides the capability to identify credit/debit cards that will expire before the next recurring service. The credit/debit card functionality enables eSN 100 to be proactive in contacting the customer to update their credit/debit card information in the system.

Service Provider Selection and Assignment Engine

The Service Provider Selection and Assignment Engine 200 manages the proper distribution of new work orders to existing partners. This engine works closely and communicates with the Real-Time Scheduling Engine 204.

When a customer places an order, this engine 200 process the Customer Order 160 to determine what options, values, preferences, etc. the customer selected. It locates a provider who performs that service within a geographic area including the customer is selected using a location identifier (e.g., a customer ZIP code). This engine 200 then checks a provider's electronic appointment calendar and resources for availability.

The Service Provider Selection and Assignment Engine 200 selects a provider from plural providers when more than one is available, cycles through providers with one or more pre-determined processes as service orders are generated, declined, or timed out, monitors time-out situations, distinguishes between primary, secondary and premium providers, and supports a Graphical User Interface ("GUI") for the customer care center staff to view the provider selection status, and make modifications and overrides. The Service Provider Selection and Assignment Engine 200 also allows for equitable distribution of Work Items 180 to providers and allows for manual intervention when modifications or overrides of assignments are required.

Service Fulfillment Tracking Engine

The Service Fulfillment Tracking Engine 202 provides a mechanism for reporting the process workflow history of a Work Item 180 generated from a Customer Lead 160 or a Customer Order 162. It works with the Workflow Engine 192 to obtain the process workflow history and provides a mechanism for filtering this information for tracking reports.

The Service Fulfillment Tracking Engine 202 can track a Work Item 180 generated from a Customer Order 160 as it moves through the eSN 100 infrastructure. For example, the Customer Order 160 includes, but is not limited to, one of the following states in the eSN 100 infrastructure: (1) the order is assigned to a provider; (2) the order is backordered or delayed; (3) a worker is dispatched to the customer's site; (4) a worker is currently performing the service; (5) a worker has completed the service; (6) the cost of the service is calculated; (7) the order has not been billed; (8) the customer's credit/debit card has been charged; (9) the invoice is settled; or (10) a check is sent to the provider. However, the present invention is not limited to these states, and more, fewer or other states can also be used.

The Service Fulfillment Tracking Engine 202 also tracks Work Items 180 generated from Customer Leads 160 as they move through plural states in the eSN 100 infrastructure. For example, a Customer Lead 160 includes, but is not limited to, one of the following states in the eSN 100 infrastructure: (1) a customer indicates interest in service, creating a lead; (2) the lead is assigned to a provider; (3) the provider contacts the customer; (4) a provider resource (e.g., a sales agent) is dispatched to the customer to perform an analysis (e.g., determine size of a lawn or the number of rooms in a residence, etc.); (5) the provider proposes a service to the customer; (6) the provider is waiting on customer response; (7) the customer contacts the provider; (8) the lead is closed, with a new order resulting; (9) the lead is closed, with no order resulting; or (10) the customer could not be contacted or located.

The Service Fulfillment Tracking Engine 202 provides better visibility to the true state of a Work Item 180 or Customer Lead 160, analyzes statistical information to improve business processes and uses the history of a Work Item 180 or Customer Lead 160 to identify problems and expedite solutions.

Real-Time Scheduling Engine

The Real-Time Scheduling Engine 204 schedules service orders in real-time with a selected provider, immediately notifies the provider, and confirms the service order with the customer in real-time. The Real-Time Scheduling Engine 204 works closely and communicates with the Service Provider Selection and Assignment Engine 200.

The Real-Time Scheduling Engine 204 can display a service provider's schedule availability in real-time to customers using a provider's electronic appointment calendar, automatically schedule an appointment for a provider for a customer's requested date and time and provide confirmation of a scheduled appointment to the customer.

Needs-Solution Identification Engine

The Needs-Solution Identification Engine 206 provides an expert system for identifying specific service needs. The expert system provides interactive questions and makes decisions on what additional interactive questions to display based on the customer's responses. As is known in the art, an "expert system" is an application program with programmed intelligence such as artificial intelligence that uses a knowledge bases and inference engines to ask questions and formulate conclusions.

For example, a customer sees a pest in his/her house and uses the eSN 100 to identify the type of pest by answering a series of interactive questions—thus determining the type of extermination service (s) he needs. The customer's order history and service information can also be accessed to help to determine specific service needs. For example, heating repair services required will likely be different for a customer with a 10-year old furnace compared to a customer with a 3-month old furnace.

The Needs-Solution Identification Engine 206 provides expertise in a variety of service areas to help customers identify problems and solutions. It also uses available customer information to further identify specific service needs (e.g., the area you live in has the same problems every year, it's now termite swarm season, other people in your area are experiencing termite problems).

Event Notification Engine

The Event Notification Engine 208 is a fault-tolerant delivery mechanism that queues and delivers event data. It allows flexibility so event data can be sent via varying technology types including e-mail, page, fax, business event, etc. The Event Notification Engine 208 provides support to the User Notification Interfaces 120 and provides the ability to customize the event data being delivered based on the system state.

Service Provider Appointment Calendaring Engine

The Service Provider Appointment Calendaring Engine 210 offers an electronic appointment calendar by which providers can manage work order appointments and other appointments such as sick days, meetings, vacation days, etc. For example, this engine's "Maintain Calendar" function used via a provider website calendar includes the ability to perform Work Item 180 related activities (e.g., edit, reschedule, invoice, cancel, print, etc.) by clicking on the work item in the calendar and the ability to select day, week, and month views of appointments, plus ability to navigate to a desired day view by clicking on that date in the week or month view.

The Service Provider Appointment Calendaring Engine 210 also shows a current date highlighted in all views, a drop-down list in views to display appointments for one specific worker, or all workers, an overview of all workers who are generally available during each hour of a selected day (day view only), the ability to add appointments by clicking an Add Appointment button on any calendar view, the ability to edit and view details of appointments by clicking on them in any calendar view, and the ability to attach notes to appointments. An icon appears next to the appointment to indicate that a note is attached.

The Service Provider Appointment Calendaring Engine 210 automatically adds appointments to a provider's electronic appointment calendar, provides a tool to manage resources, is used to determine resources and timeslot availability for customer orders, and provides the eSN 100 with detailed information about the operations of brands and branches and can be used to analyze operating efficiencies and resource utilization. For example, it provides the ability to compare actual delivery versus scheduled delivery across the entire eSN 100 enterprise.

The Service Provider Appointment Calendaring Engine 210 also provides enterprise-wide visibility into electronic appointment calendars that are not changeable by, or maintainable by this engine, such as external service providers, that are not owned or directly controlled by the deployers of the eSN 100.

The Service Route Calculation Engine

The Service Route Calculation Engine 212 provides a method for providers to use intelligent routing to schedule and route service appointments. This engine performs routing functions by collecting location data from the service work order, and scheduling and resource data from the Provider Profile 172 and Technician Profile 174. The Service Route Calculation Engine 212 helps maximize the efficiency of provider resources by minimizing travel to and from work sites. For example if three customers order lawn fertilization services on the same city block, the Service Route Calculation Engine 212 will schedule the lawn fertilization services for these three customers on the same day with the same provider resources (e.g., the same lawn fertilization crew and spray truck). This engine 212 also interacts with the Workflow Engine 192, the Service Fulfillment Tracking Engine 202, the Real-Time Scheduling Engine 204, the Service Provider Appointment Calendaring Engine 210, and other engines and applications in the eSN 100.

Common Loin and Role Based Security Engine

The Common Login and Role Based Security Engine 214 provides the basis for the Application Manager's 140 ability to dynamically generate a menu of eSN Applications 142, which is based on the security rights of the user. Rather than having separate logins and passwords for each eSN application, the Common Login and Role Based Security Engine 214 uses corporate infrastructure directory services. This provides the enterprise with a standard security infrastructure across all systems and applications.

The Common Login and Role Based Security Engine 214 allows access to eSN Applications 142 based on a common login and password, sets security based on user and group rights, and simplifies the maintenance of logins and passwords.

Resource Management Engine

A Resource Management Engine 216 enables providers to define resources. A "resource" includes, but is not limited to, individual workers, equipment that can be scheduled, crews of workers, sales personnel, other types of personnel and other types of resources.

This engine 216 separate services and schedules for each resource and also includes electronic resource scheduling and calendaring functions. The eSN 100 uses this functionality from the Service Provider Selection and Assignment Engine 200 to identify an available provider, display the provider's available service dates and times to the customer, and schedule the appointment when a customer orders a service on a provider site 250 or via the eSN website 120.

A resource overview gives providers' a high level view of workers' skills, work preferences, available service and timeslots so providers can easily determine availability and coverage. For example, a first work can apply lawn fertilizer only, while a second work can apply all types of chemicals including lawn fertilizer, termite spray, other pest sprays, etc.

The Resource Management Engine 216 creates the basis for scheduling and calendaring functions, provides a tool for managing resources, and allows flexibility in defining resources.

Invoicing and Settlement Engine

An Invoicing and Settlement Engine 218 provides an online invoicing function that allows providers to invoice the eSN 100 electronically for eSN-related services they perform. It interfaces with the Billing and Credit Card Processing Engine 198 to invoice and settle to orders. The online invoicing function generates a work order invoice using the customer order, allows the provider to change the service scope and amount, displays all original service information, allows for quotes and upsells, allows for customer payment to the provider at the time the service is performed.

The Invoicing and Settlement Engine 218 provides flexibility if customer decides to change payment method at the time the service is performed, can be completed easily by selecting a work order on the provider's calendar, and tracks provider payments online, and display which payments apply to which orders.

The Invoicing and Settlement Engine 218 also provides settlement, collection from customer, with automatic payment to a provider including automatic electronic payment, sending a check via U.S. Mail, etc. This engine 218 also provides automatic collection of transfer fees from provider, significantly reduces manual intervention and errors, provides a paperless and flexible invoicing method, and enhances scalability.

External Components

The electronic services network architecture also includes a number of cooperating external components and entities including external Users, external User Interface Devices and external Network Connectivity. However, the present invention is not limited to the components described and more or fewer components can also be used.

The Users include strategic partners 220, customers 222, customer care agents 224, service providers 226, and service technicians 228.

The User Interface Devices include web-browsers 230, e-mail client 232, WAP devices 234, telephones 236, fax machines 238, one and two-way pagers 240, and voice mail 243.

The Network Connectivity includes the Internet 244, intranets and the public switched telephone network ("PSTN") 246. Other external components include plural service provider/partner sites 250 and plural partner legacy systems 248.

However, the present invention is not limited to such an embodiment and more or fewer internal and/or external components can also be used.

Using the Electronic Services Network to Initiate Services

Figure 2:
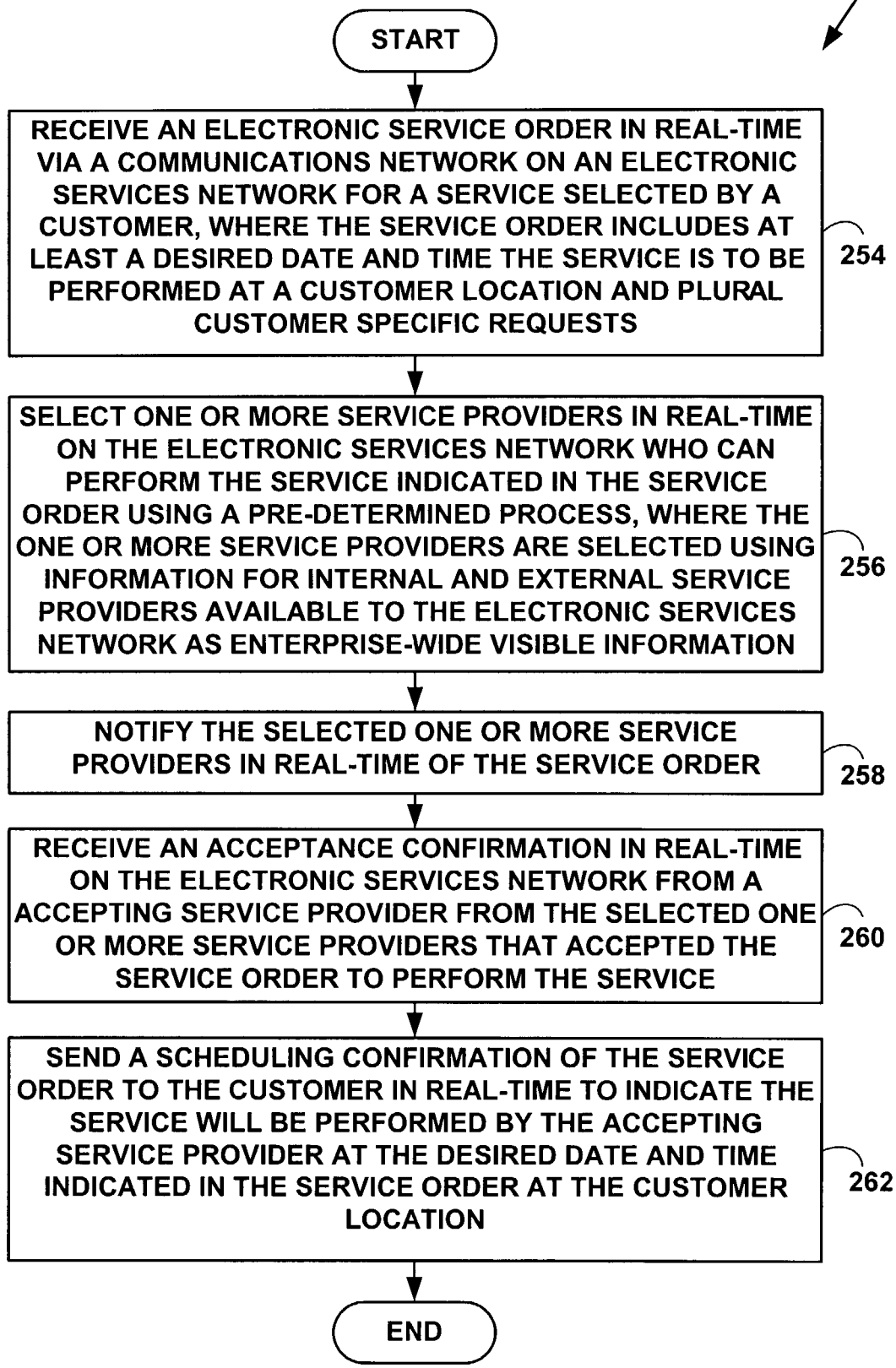
FIG. 2 is a flow diagram illustrating a method for initiating services via an electronic services network.

FIG. 2 is a flow diagram illustrating a Method 252 for initiating services via an electronic services network. At Step 254, a service order for a service selected by a customer is received in real-time via a communications network on an electronic services network. The service order includes at least a desired date and time the service is to be performed at a specified customer location and plural customer specified requests. The service order includes, but is not limited to, this information and typically includes other additional information. At Step 256, one or more service providers are selected in real-time on the electronic services network who can perform the service using a pre-determined process. The one or more service providers are selected using information for internal and external service providers available to the electronic services network as enterprise-wide visible information. The enterprise-wide visible information includes information that is maintained and can be modified by the electronic services network and information that is not maintained and cannot be modified by the electronic services network. At Step 258, the selected one or more service providers are notified in real-time 10 of the service order from the electronic services network. At Step 260, an acceptance confirmation is received in real-time on the electronic services network from an accepting service provider from the selected one or more service providers that accepted the service order to perform the service. At Step 262, a scheduling confirmation of the service order is sent to the customer in real-time to indicate the service will be performed by the accepting service provider using the plural customer specified requests at the desired date, time and specified customer location indicated in the service order. Method 252 is illustrated with an exemplary embodiment. However, the present invention is not limited to this exemplary embodiment and other embodiments can also be used to practice the invention illustrated by Method 252.

In such an exemplary embodiment at Step 254, a service order for a service selected by a customer is received in real-time via the Internet 244 or PSTN 246 on the eSN 100. The service order includes, but is not limited to, an electronic service order, a voice service order, etc. The service order also includes, but is not limited to, orders for home services, business services, or other types of services (e.g., managed services, etc.).

The service order includes a request for a specific service to be performed, and at least a desired time and date the specific service will be performed and other information, such as location information for the customer, etc. A customer selected a service to be performed via a partner site 250 or via the eSN website 120, or by another process. A customer can select a nationally offered home service (e.g., ServiceMaster Clean, Merry Maids, Terminix, TruGreen Chemlawn, TruGreen LandCare, etc.) that is fulfilled by local service providers in the customer's local geographic area. The customer can schedule services from nationally known service providers, helping to provide dependability, confidence and quality-of-service typically associated with such national providers, and yet have the actual services provide by service providers in the customer's local community.

The service order includes, plural customer specific requests such as, selecting a specific service provider worker with specific skills, (e.g., I want Mary to clean my residence, she does a better job than Bill, etc.), specific service provider equipment, (e.g., don't send truck 63 to fertilize my lawn, it makes too much noise, etc.), service fulfillment requests (e.g., use the side-door only, take off your shoes before entering the residence, etc.) and other customer specific requests.

A customer generates the service order via the Web/HTML User Interface 122, the IVR Interface 124 or the Wireless/WAP/HDML Interface 126. In one embodiment of the present invention, the service order is received from the customer on the eSN 100 in XML format via the Data Exchange XML Interfaces 112. In another embodiment of the present invention, the service order is received on the eSN 100 in a legacy format via the Legacy Infrastructure Interfaces 114.

At Step 256, one or more service providers are selected in real-time who can perform the service requested in the service order using a pre-determined process on Service Provider Selection and Assignment Engine 200. The one or more service providers are selected in real-time in-part using customer location information from the service order as well as plural service provider electronic appointment calendars for internal and external service providers available and visible enterprise-wide from the Information Repository 158 and useable from the Service Provider Appointment Calendaring Engine 210.

A selected service provider has to have the time as well as the proper resources available to complete the service order from the customer, taking into account the plural specific customer requests. For example, a customer may require plumbing services. However, the service provider may have the time to complete the service order, but the service provider's only licensed plumber may have quit or gone on vacation. Thus, the service provider cannot accept service order from the customer.

The electronic appointment calendars include information that is maintained and can be modified by the Service Provider Appointment Calendaring Engine 210 and information that is not maintained and cannot be modified by the Service Provider Appointment Calendaring Engine 210. The Service Provider Selection and Assignment Engine 200 uses timing mechanisms such as timers to select service providers in real-time.

Figure 4:
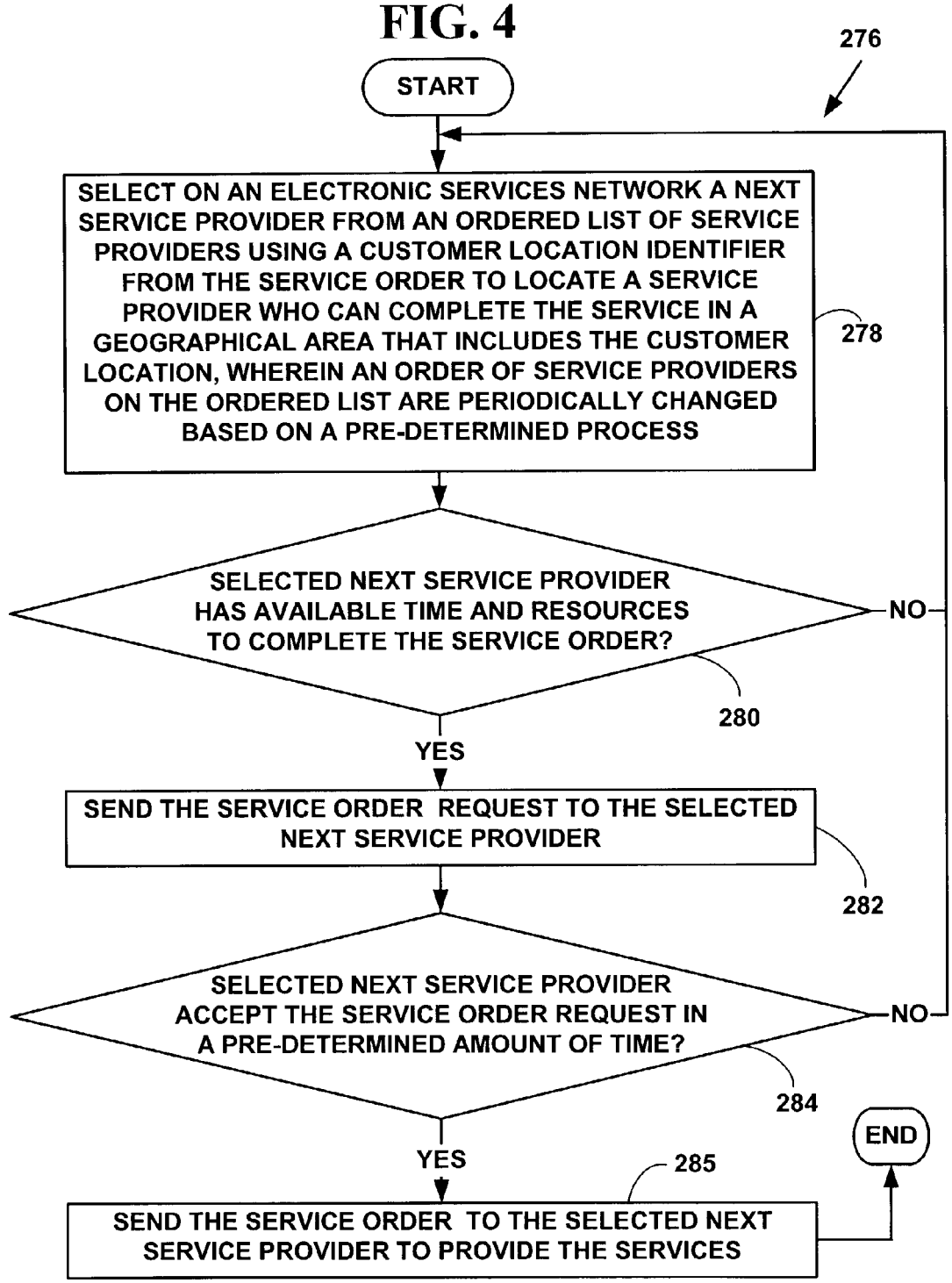
FIG. 4 is a flow diagram illustrating a method for dynamically selecting a set of service providers in real-time to perform a service initiated by a service order.

A primary, secondary service provider or other types of services providers may be selected. In the situation where the primary service provider does not, or cannot accept the service order, the service order may then be offered to the secondary service provider or other service provider. Another type of service provider may also be selected, such as a "premium" service provider explained below. FIG. 4 below illustrates one pre-determined process used to select service providers.

Returning to FIG. 2 at Step 258, the selected one or more service providers are notified in real-time of the service order by the Real-Time Scheduling Engine 204. The selected one or more service providers can accept, decline or ignore the service order. The Real-Time Scheduling Engine 204 uses timing mechanisms such as timers to wait for a response from the selected one or more service providers.

At Step 260, an acceptance confirmation is received in real-time on the Real-Time Scheduling Engine 204 from an accepting service provider from the set of service providers that accepted the service order to perform the service. The accepting service provider that accepts the service order has the time and resources to perform the service at the customer location during the date and time indicated in the service order.

At Step 262, a scheduling confirmation of the service order is sent to the customer in real-time by the Real-Time Scheduling Engine 204 via the Event Notification Engine 208 and the User Notification Interfaces 120. The customer receives a real-time confirmation of the service order to indicate the service will be performed by the accepting service provider using the plural customer specified requests at the desired date, time and specified customer location indicated in the service order.

In one embodiment of the present invention, the customer will receive a real-time scheduling confirmation typically within a few seconds, and at the most a few minutes of submitting a service order for a selected service. In such an embodiment, the selected service providers all have computers or other devices in communications with the eSN 100.

In another embodiment of the present invention, the customer will receive a scheduling confirmation within a longer specified time period (e.g., "semi real-time" or "pseudo real-time") after submitting a service order for a selected service. Such an embodiment allows selected service providers to manually accept or reject a service order. For example, a service provider may only have a fax machine or just a standard telephone and not have a computer. This type of service provider needs additional time to accept or decline a service order.

Figure 3:
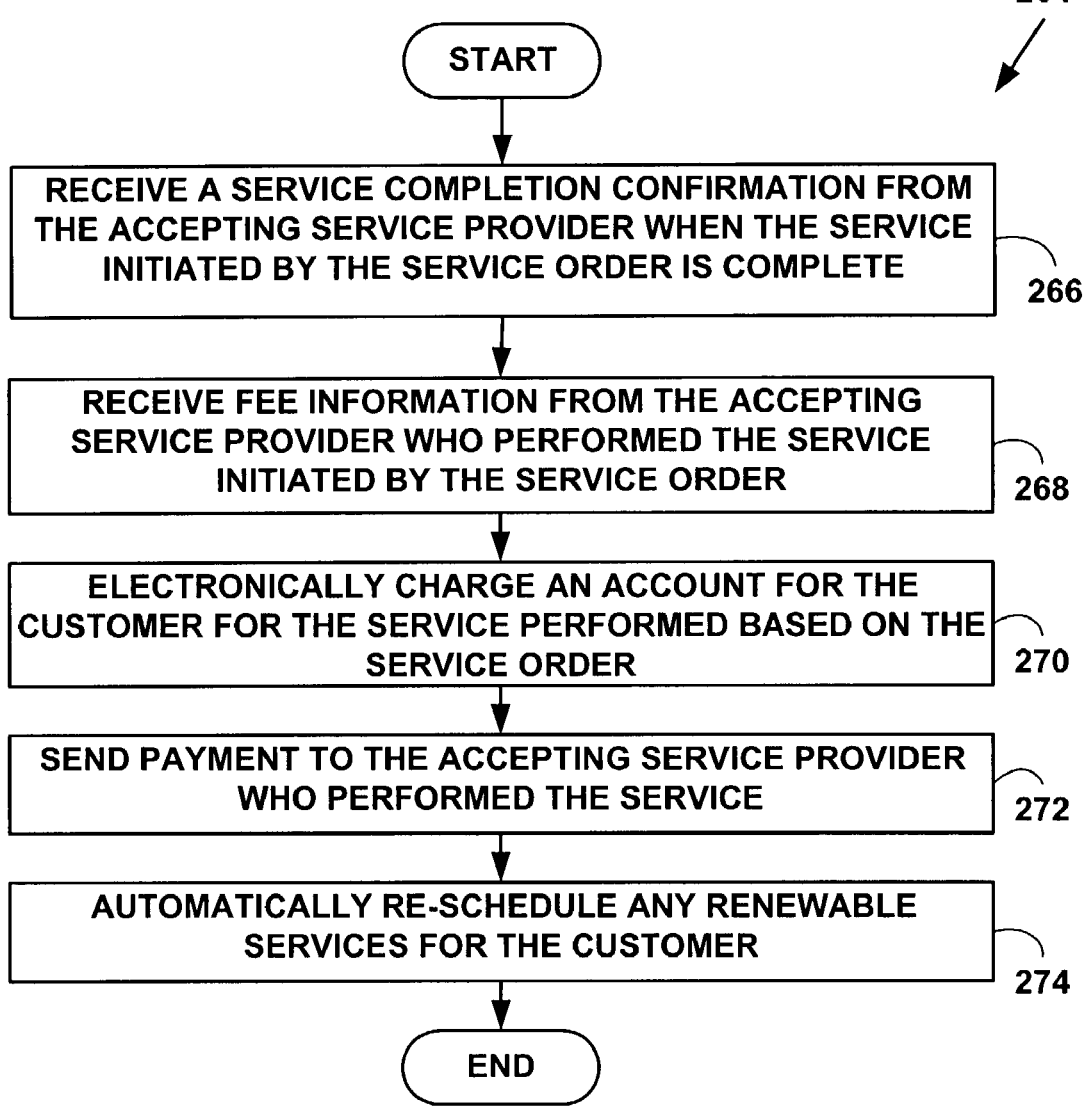
FIG. 3 is a flow diagram illustrating a method for confirming performance of services via an electronic services network.

FIG. 3 is a flow diagram illustrating a Method 264 for confirming performance of services via an electronic services network. At Step 266, a service confirmation from the accepting service provider (Method 252) is received on the electronic services network when the service initiated by the service order is complete. At step 268, electronic fee information is received from the accepting service provider who performed the service initiated by the service order. At Step 270, an account for the customer is charged electronically for the service performed based on the order request. At Step 272, payment is sent to the accepting service provider who performed the service. At Step 274, any renewable services for the customer are automatically re-scheduled from the electronic services network. A "renewable service" is a service that a customer desired to be repeated perpetually, or for a desired period of time. For example a renewable service may be a desire of a customer to have his/her house cleaned every Thursday, perpetually. A customer may also desire to have his/her lawn fertilized once a month, but only during the months of April through September.

Method 264 is illustrated with an exemplary embodiment. However, the present invention is not limited to this exemplary embodiment and other embodiments can also be used to practice the invention illustrated by Method 264.

At Step 266, a service confirmation from an accepting service provider is received on the Service Provider Selection and Assignment Engine 200 when the service initiated by the service order is complete. This confirmation is received via the Data Exchange XML Interfaces 112 or the Legacy Infrastructure Interfaces 114. At Step 268, electronic fee information is received from the accepting service provider who performed the service initiated by the service order on the Invoice and Settlement Engine 218. The fee information is received via the Data Exchange XML Interfaces 112 or the Legacy Infrastructure Interfaces 114. At Step 270, an account for the customer is charged electronically for the service performed based on the electronic fee information provided by the Billing and Credit Card Processing Engine 198.

At Step 272, payment is sent to the accepting service provider who performed the service from the Invoicing and Settlement Engine 218. Electronic payments are sent via the Data Exchange XML Interfaces 112 or the Legacy Infrastructure Interfaces 114. In one embodiment of the present invention, an electronic payment is made to a bank account for the accepting service provider for the services performed. In another embodiment of the present invention, a paper check is issued and mailed to the accepting service provider for the services performed.

At Step 274, any renewable services for the customer are automatically re-scheduled from the electronic services network from the Service Provider Appointment Calendaring Engine 210 using the electronic appointment calendar for the accepting service provider, or another service provider and via the Data Exchange XML Interfaces 112 or the Legacy Infrastructure Interfaces 114.

In one embodiment of the present invention, Method 252 may further comprise the steps of Method 264 and be used as a single unified method. However, the present invention is not limited to such an embodiment and Methods 252 and 264 may be used independently as stand-alone methods.

Dynamically Selecting a Set of Service Providers on the Electronic Services Network FIG. 4 is a flow diagram illustrating a Method 276 for dynamically selecting a set of service providers in real-time to perform a service initiated by a service order. At Step 278, a next service provider is selected on an electronic services network from an ordered list of service providers using at least a customer location identifier from the service order to locate a service provider who can complete the service in a geographical area that includes the customer location. The next service provider is also selected using information for internal and external service providers available to the electronic services network as enterprise-wide visible information. An order of service providers on the ordered list is periodically changed based on a pre-determined process. At Step 280, a test is conducted on the electronic services network to determine whether the selected next service provider has available time and resources to complete the service order. If the selected next service provider has available time and resources to complete the service order, at Step 282, the service order is sent to the selected next service provider. At Step 284, a test is conducted to determine whether the selected next service provider has accepted the service order within a pre-determine amount of time. If the selected next service provider has accepted the service order within a pre-determined amount of time, at Step 285, the service order is assigned to the selected next service provider to complete the service.

If at Step 284 the selected next service provider has not accepted the service order within a pre-determined amount of time, Steps 278-285 are repeated until the service order is assigned to a selected next service provider.

If at Step 280, the selected next service provider does not have available time and resources to complete the service order, Steps 278-285 are repeated until a next service provider is selected that does have available time and resources to complete the service order.

Method 276 is illustrated with an exemplary embodiment. However, the present invention is not limited to this exemplary embodiment and other embodiments can also be used to practice the invention.

In such an exemplary embodiment at Step 278, a next service provider is selected on the eSN 100 from an ordered list of service providers using a location identifier (e.g., a ZIP code) from the service order to locate a service provider who c an complete the service in a geographical area that includes the customer location.

The next service provider is also selected using information for internal and external service providers available to the electronic services network as enterprise-wide visible information. A next service provide is selected in in-part using plural service provider electronic appointment calendars for internal and external service providers available and visible enterprise-wide from the Information Repository 158 on the eSN 100 and useable from the Service Provider Appointment Calendaring Engine 210. The electronic appointment calendars include information that is maintained and can be modified by the Service Provider Appointment Calendaring Engine 210 and information that is not maintained and cannot be modified by the Service Provider Appointment Calendaring Engine 210.

An order of service providers on the ordered list is periodically changed based on a pre-determined process. An order of service providers on the ordered list is periodically changed based on pre-determined process including, but not limited to, Business Rules 184, a round robin process, performance criteria of service providers process, payment of additional fees by service providers, or other criteria.

The Service Provider Selection and Assignment Engine 200 uses Business Rules 184 to intelligently distribute the service orders to the appropriate service providers.

The round-robin process allows the Service Provider Selection and Assignment Engine 200 to cycle through a list of all service providers. The round-robin process treats all service providers equally.

A list order of a service provider can also be selected based on performance criteria, with the service providers who provide the "best" service placed in a rank order at the top of the ordered list. The performance criteria may include such factors as most on-time arrivals at customer location, most on-time completion of services, fewest customer complaints, etc. The order of such service providers is changed by some pre-determined process such as the Business Rules 184, round-robin process, or some other process to ensure most service providers will eventually be offered service orders from customers.

A list order of service providers may also be selected based on payment of additional fees. Service providers who select to subscribe to a "premium" service selection level by paying fees will be placed at the top of the order list. The order of such service providers may then be changed by some pre-determined process such as the Business Rules 184, round-robin process, or some other process.

Service providers who have poor performance criteria or elected not to pay additional fees, will typically only be offered service orders if other service providers cannot accept a service order because they don't have available timeslots or available resources to complete the service order.

At Step 280, a test is conducted on Service Provider Selection and Assignment Engine 200 to determine whether the selected next service provider has available time and resources to complete the service order. If the selected next service provider has available time and resources to complete the service order, at Step 282, the service order is sent to the selected next service provider.

At Step 282, the Real-Time Scheduling Engine 204 notifies that selected next service provider that there is a service order they need to accept and acknowledge or decline within a pre-determined amount of time. A test is conducted on the Real-Time Scheduling Engine 204 to determine whether the selected next service provider has accepted the service order within a pre-determined amount of time. If the selected next service provider has accepted the service order within a pre-determined amount of time, at Step 284, the service order is assigned to the selected next service provider and the provider.

If the selected next service provider has not accepted the service order within a pre-determined amount of time, Steps 278-285 are repeated until the service order is assigned to a selected next service provider.

If at Step 280, the selected next service provider does not have available time and resources to complete the service order, Steps 278-285 are repeated until a next service provider is selected that does have available time and resources to complete the service order.

Figure 5:
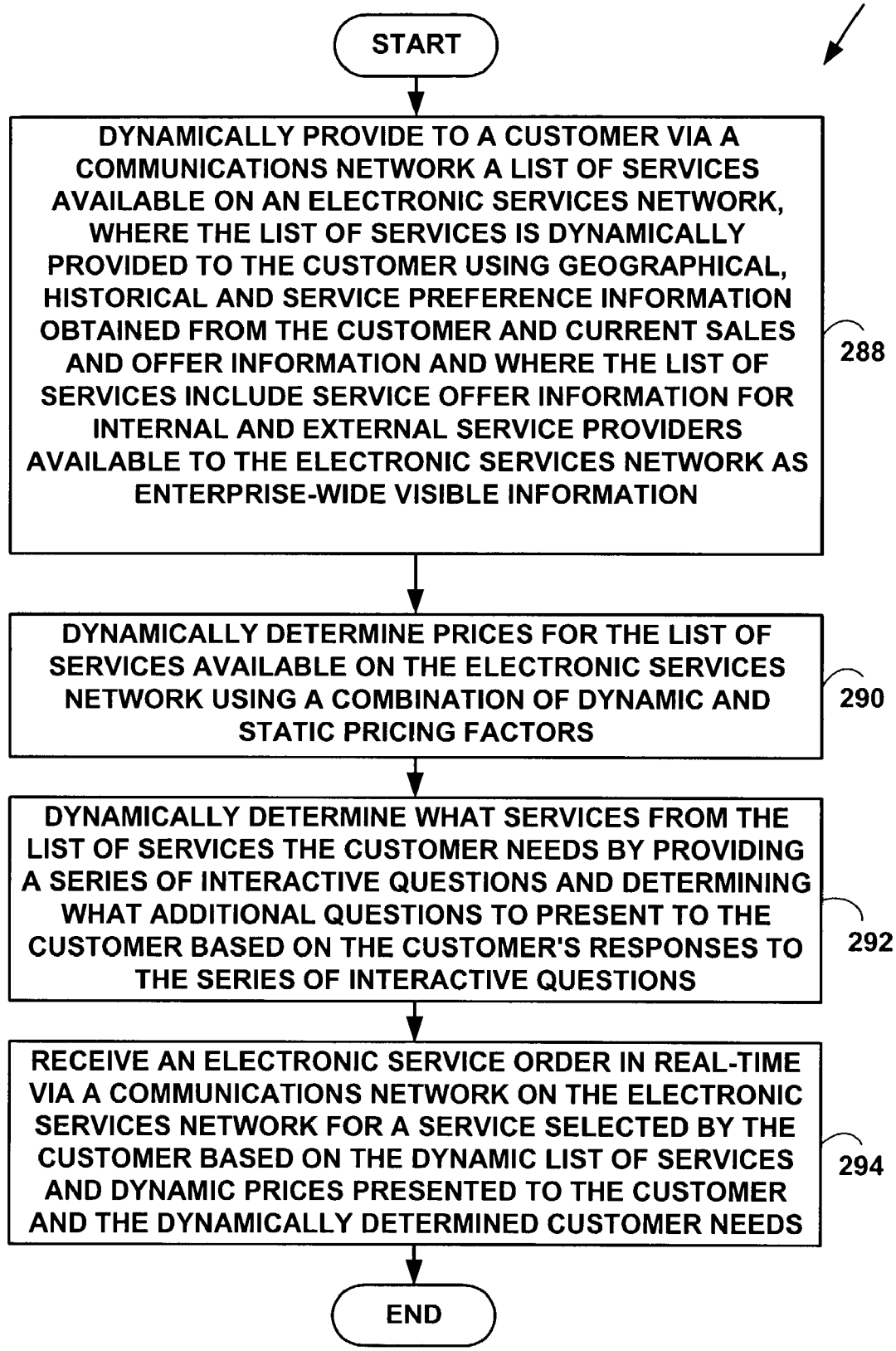
FIG. 5 is a flow diagram illustrating a method for providing customized information for services available via an electronic services network.

Providing Customized Information for Services Available on the Electronic Services Network FIG. 5 is flow diagram illustrating a Method 286 for providing customized information for services available via an electronic services network. At Step 288, a customer is dynamically provided via a communications network a list of services available on the electronic services network. The list of services is dynamically provided to the customer using geographical, historical, service preference or lead information obtained from the customer and current sale and service offer information from an internal or external service provider or from the electronic services network. The service offer information includes information for internal and external service providers available to the electronic services network as enterprise-wide visible information. At Step 290, prices for the list of services available on the electronic services network are dynamically determined using a combination of dynamic and static pricing factors. At Step 292, what services from the list of services the customer needs are dynamically determined by providing a series of interactive questions and determining what additional questions to present to the customer based on the customer's responses to the series of interactive questions. At Step 294, a service order is received in real-time via a communications network on the electronic services network for a service selected by the customer based on the dynamic list of services and dynamic prices presented to the customer and the dynamically determined customer needs.

Method 286 is illustrated with an exemplary embodiment. However, the present invention is not limited to this exemplary embodiment and other embodiments can also be used to practice the invention.

In such an embodiment at Step 288, a customer is dynamically provided via the Internet 244 or the PSTN 246 a list of services available via the eSN 100. The list of services is dynamically provided to the customer by the Preference and Personalization Engine 194 using geographical, historical, service preference or lead information obtained from the customer and sale and service offer information from a service provider or the eSN 100. The service offer information includes information for internal and external service providers available to the eSN 100 as enterprise-wide visible information that is stored in the Information Repository 158. This engine 194 uses templates, text, and images to dynamically build electronic content appropriate for the current time of year and weather conditions, for example.

At Step 290, prices for the list of services available on eSN 100 are dynamically determined using a combination of dynamic and static pricing factors. The Factor-based Pricing Engine 196 dynamically determines prices by applying the combination of dynamic and static pricing factors including regional pricing differences, market pricing differences, regulation pricing differences, tax pricing differences, partner pricing, promotion codes, or co-branded site pricing.

At Step 292, what services from the list of services the customer needs are dynamically determined by providing a series of interactive questions and determining what additional questions to present to the customer based on the customer's responses to the series of interactive questions. The Needs-Solution Identification Engine 206 provides an expert system for identifying specific service needs. The expert system provides interactive questions and makes decisions on what additional interactive questions to display based on the customer's responses.

At Step 294, a service order is received in real-time via the Internet 244 or PSTN 246 for a service selected by the customer based on the dynamic list of services and dynamic prices presented to the customer and the dynamically determined customer needs.

Via the eSN 100 and Method 286, a customer is offered customized information and prices and can schedule nationally offered home services (e.g., ServiceMaster Clean, Merry Maids, Terminix, TruGreen Chemlawn, TruGreen LandCare, etc.) that are fulfilled by local service providers in the customer's local geographic area. The customer can schedule services from nationally known service providers, helping to provide dependability, confidence and quality-of-service typically associated with such national providers, and yet have the actual services provide by service providers in the customer's local community.

In one embodiment of the present invention, the service order is received on the eSN 100 in XML format via the Data Exchange XML Interfaces 112. In another embodiment of the present invention, the service order is received on the eSN 100 in a legacy format via the Legacy Infrastructure Interfaces 114.

The service order may also include Customer Lead 160 information collected from one or more customer queries that did not result in additional service order requests to purchase other services as a result of the one or more customer queries. Any such Customer Lead 160 information is stored in the Information Repository 158, so it can be used to generate additional information about or for the customer.

Method 286 may also further comprise sending a scheduling confirmation of the service order to the customer in real-time via an Event Notification Engine 208 and the User Notification Interfaces 128.

Dynamically Scheduling Services on the Electronic Services Network

FIG. 6 is a flow diagram illustrating a Method 296 for dynamically scheduling services via an electronic services network. At Step 298, plural electronic appointment calendars are made available to an electronic services network. The plural electronic appointment calendars include electronic appointment calendars for internal and external service providers available to the electronic services network as enterprise-wide visible information. Only selected ones of the plural electronic appointment calendars are maintainable from the electronic services network. At Step 300, a determination is made in real-time on the electronic services network using the available plural electronic appointment calendars whether one or more service providers have available resources on a selected day and time to accept a service order from a customer.

Method 296 is illustrated with an exemplary embodiment. However, the present invention is not limited to this exemplary embodiment and other embodiments can also be used to practice the invention.

In such an embodiment at Step 298 plural electronic appointment calendars are made available to the eSN 100 via the Service Provider Selection and Assignment Engine 200. As was described above, the Service Provider Selection and Assignment Engine 200 checks the plural electronic appointment calendars of services providers for resource and date and time availability. The plural electronic appointment calendars include electronic appointment calendars for internal and external service providers available to the eSN 100 as enterprise-wide visible information. Only selected ones of the plural electronic appointment calendars are maintainable from the eSN 100.

The electronic appointment calendars include selected ones that are maintained and can be modified by the Service Provider Appointment Calendaring Engine 210. The plural electronic appointment calendars also include calendars that are not maintained and cannot be modified by the Service Provider Appointment Calendaring Engine 210 such as external service provider or partner calendars.

At Step 300, a determination is made in real-time on the eSN 100 using the plural electronic appointment calendars whether one or more service providers have available resources on a selected day and time to accept a customer service order. One or more service providers can then be selected on the eSN 100 in real-time as was described above for Method 264, for example.

Collecting Customer Lead Information Via the Electronic Services Network

FIG. 7 is a flow diagram illustrating a Method 302 for collecting customer lead information via an electronic services network. At Step 304, the electronic services network receives a first customer query for service provider information from a potential customer via a communications network. At Step 306, a customer is dynamically provided via the communications network a list of services available on the electronic services network. The list of services is dynamically provided to the customer using information obtained from the potential customer query as well as current sale and service offering information. At Step 308, the electronic services network receives one or more subsequent customer queries, wherein the one or more subsequent customer queries do not result in a service order to purchase services. At Step 310, information from the first and one or more subsequent customer queries are saved as potential customer leads in a database on the electronic services network. At Step 312, the potential customer lead is managed via the electronic services network through a plurality of states until the potential customer lead is closed, with a new service order resulting or the potential customer lead is closed, with no new service order resulting. The potential customer lead is managed using information for internal and external service providers available to the electronic services network as enterprise-wide visible information.

Method 302 is illustrated with an exemplary embodiment. However, the present invention is not limited to this exemplary embodiment and other embodiments can also be used to practice the invention.

In such an embodiment at Step 304, the eSN 100 receives a first customer query for service provider information from a potential customer via the Internet 244 or the PSTN 246. The customer may simply be browsing a service provider website 250 or the eSN website 120 to obtain information. The customer browsing activity can be collected and stored as customer lead 160 information to later target this browsing customer as a new potential customer of services. The eSN 100 also collects other type of customer lead information. The customer may call a call center associated with the eSN 100 and leave voice information, send e-mail for a fax to the eSN 100, send an instant message to the eSN 100, or otherwise leave customer information that is used as lead information.

In one embodiment of the present invention, customer queries are received on the eSN 100 in XML format via the Data Exchange XML Interfaces 112. In another embodiment of the present invention, customer queries are received on the eSN 100 in a legacy format via the Legacy Infrastructure Interfaces 114.

At Step 306, a customer is dynamically provided via the communications network a list of services available on the electronic services network. The list of services is dynamically provided to the customer by the Preference and Personalization Engine 194 using geographical, e-mail, fax, voice, Internet or other information obtained from the first query and sale and service offer information from a service provider or from the eSN 100. This engine uses templates, text, and images to dynamically build electronic content appropriate for the current time of year and weather conditions, for example. The list of services provided may be used at this step in a manner similar to that described by Method 286. However, the present invention is not limited to such an embodiment and Step 306 can be practiced in other ways.

For example, in one embodiment of the present invention, the customer may be simply be asked to input a ZIP code to receive service information. In another embodiment of the present invention, the customer may also be asked to input an e-mail address before receiving any service information. In another embodiment of the present invention, the customer may also be asked to input full customer information including name, address, phone number, e-mail, address, etc. before they are allowed to view any service information. The customer may be offered some incentive for providing full information (e.g., an electronic coupon, immediate discount on service purchases, etc.). If the query was obtained via the Internet, information in the query such as a customer IP address, digital cookie information, or other Internet Protocol suite information may be also collected.

At Step 308, the eSN 100 receives one or more subsequent customer queries. The one or more subsequent customer queries allow the potential customer to browse information, but do not result in a service order to purchase services. The potential customer may be checking service availability, service pricing, etc. before making a decision. The Preference and Personalization Engine 194, the Factor-base Pricing Engine 196 and the Needs-Solution Identification Engine 206 may be used at this step in a manner similar to that described by Method 286. However, the present invention is not limited to such an embodiment and Step 306 can be practiced in other ways. Other eSN 100 engines describe above may also be used at this and the other steps described for Method 302.

At Step 310, information from the first and one or more subsequent customer queries are saved as a potential Customer Lead 160 in the Information Repository 158 on the eSN 100 with the Preference and Personalization Engine 194. The customer leads 160 are then subsequently used to generate e-mail or paper mail advertising that may be sent to the potential customer. The Customer Lead 160 information is also compared and analyzed with respect to Customer Order 162 information, when a potential customer becomes an actual customer of service provided via the eSN 100 at some later time. This comparison and analysis helps improve business processes to allow a quality organization to intervene in business process to further improve the types of services offered, quality of service, service delivery, speed of service, etc.

At Step 312, the potential Customer Lead 160 is managed via the Workflow Engine 192 and the Service Fulfillment Tracking Engine 202 through a plurality of lead states until the potential customer lead is closed, with a new service order resulting, or the potential customer lead is closed, with no new service order resulting.

The Service Fulfillment Tracking Engine 202 cooperates with the Work Flow Engine 192 which uses the Information Repository 158, the Business Rules 184 and the State Management Rules 190 to help assist in management of the potential Customer Lead 160. These engines also cooperate with the with Process State Transition Interface 116. As was described above, the Process State Transition Interface 116 allows external providers to record their local process state transitions into the eSN Information Repository 158 for Customer Leads 160 and Customer Orders 162. The potential Customer Lead 160 is managed using information for internal and external service providers available to the eSN 100 as enterprise-wide visible information.

For example, as was also described above, the potential Customer Lead 160 is managed through a number of states using enterprise-wide visible information. The Customer Lead 160 is given to a selected service provider that may be an external service provider. The service provider contacts the customer and a provider resource (e.g., a sales agent) may be dispatched to the customer to perform an analysis (e.g., determine size of a lawn or the number of rooms in a residence, etc.), or may talk to the customer on the telephone, etc. The service provider proposes a service offer to the customer and the customer accepts the service offer as a service order or declines the service offer.

The present invention was described with respect to selecting, scheduling confirming, purchasing, invoicing, billing and settling customer service orders. The present invention may help improve the selection, scheduling, purchasing, confirmation, invoicing, billing and settlement of home service orders from customers. However, the present invention is not limited to home services and also be used for business services, or other types of services (e.g., managed services, etc.). In addition the present invention can also be used to perform the same tasks described for services with respect to goods.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. An electronic services network system, comprising, in combination:
    a plurality of data exchange interfaces to facilitate transactions with partner sites and legacy data processing infrastructures, automatically accept new leads, new user transactions and new orders for goods or services and synchronize workflow process state transitions, wherein the workflow process state transitions include internal and external workflow states and transitions defined by internal and external partners and wherein and the internal and external workflow process state transitions are synchronized between internal and external partners cooperating to provide the goods or services;
    a plurality of user interfaces to communicate with a plurality of different user devices via a plurality of different communications protocols;
    a plurality of user notification interfaces to deliver event notifications to user devices related to goods or services for events that require an immediate response;
    an application manager to provide a common entry point for a plurality of applications used on the electronic services network system;
    a plurality of applications managed by the application manager to provide a plurality of different types of support assistance in the electronic services network system;
    an information repository for storing and retrieving customer lead, customer order workflow information and other types of information obtained from customers, and partners generated using the electronic services network system; and
    a plurality of functional engines to provide functionality to select, schedule, confirm, purchase, invoice, bill and settle orders for goods or services, wherein the plurality of functional engines include Workflow, Preference and Personalization, Service-Fulfillment Tracking, Factor-based pricing, Real-Time Scheduling, Billing and Credit Card processing, Need-Solution Identification, Service Provider Network, Provider Selection and Assignment, Event notification, Service Appointment Calendaring, Resource Management, Service Route Calculation, Invoicing Settlement and Renewal Engines;
    wherein the plurality of functional engines help provide enterprise-wide visibility and management of business processes for the internal and external partners; and
    wherein orders for the goods or services are accepted and scheduled in real-time via a computer network and confirming scheduling of delivery, handling of administrative and business details for both customers and service providers and fulfilling, tracking and settling orders for the goods or services are completed in real-time.

2. The electronic services network system of claim 1 wherein the plurality of data exchange interfaces include a plurality of Data Exchange extensible markup language (XML) Interfaces, a plurality of Legacy Infrastructure Interfaces, and a Process State Transition Interface.

3. The electronic services network system of claim 1 wherein the plurality of user interfaces include a plurality of Web, Hypertext Markup Language (HTML) Interfaces, a plurality of Interactive Voice Response (IVR), Voice Extensible Markup Language (VoiceXML) Interfaces, a plurality of Wireless, Wireless Application Protocol (WAP) or Handheld Device Markup Language (HDML) Interfaces.

4. The electronic services network system of claim 1 wherein the plurality of user notification interfaces include a plurality of One or Two-Way Pager, Facsimile, Electronic Mail (e-mail), or Instant-Messaging (IM) Interfaces.

5. The electronic services network system of claim 1 wherein the application manager also serves as a common entry point for a variety of internal and external users including customers, partners, service providers, call center agents, sales agents, enterprise managers, branch managers, and business analysts.

6. The electronic services network system of claim 1 wherein a plurality of applications include, E-Commerce, Provider Portal, Customer Relations Management (CRM), Lead Management, Administrative Tools, Accounts Receivable (AR), Accounts Payable (AP), and Reporting applications.

7. The electronic services network system of claim 1 wherein the information repository includes a plurality of electronic data sets.

8. The electronic services network system of claim 1 wherein the plurality of electronic data sets include Customer Leads, Customer Orders, Customer Profiles, Service Address Profiles, Service Work Orders, Market Data, Provider Profiles, Technician Profiles, Service Appointments, Customer Contacts, Work Items, Work Assignments and Business Rules.

9. The electronic services network system of claim 1 wherein the plurality of functional engines enforce Business Rules to provide a uniform quality-of-service ("QoS" within the electronic services network system.

10. An electronic services network system, comprising, in combination:
a plurality of data exchange interfaces to facilitate transactions with partner sites and legacy data processing infrastructures, automatically accept new leads, new user transactions and new orders for goods or services and synchronize workflow process state transitions,
wherein the plurality of data exchange interfaces include a plurality of Data Exchange extensible markup language (XML) Interfaces, a plurality of Legacy Infrastructure Interfaces, and a Process State Transition Interface;
a plurality of user interfaces to communicate with a plurality of different user devices via a plurality of different communications protocols;
a plurality of user notification interfaces to deliver event notifications to user devices related to goods or services for events that require an immediate response, wherein the plurality of user notification interfaces include a One or Two Way Pager, Facsimile, Electronic Mail (e-mail), or Instant-Messaging (IM) Interface;
an application manager to provide a common entry point for a plurality of applications used on the electronic services network system;
a plurality of applications managed by the application manager to provide a plurality of different types of support assistance in the electronic services network system, wherein the plurality of applications include an E-Commerce, Provider Portal, Customer Relations Management (CRM), Lead Management, Administrative Tools, Accounts Receivable (AR), Accounts Payable (AP), and Reporting applications
an information repository for storing and retrieving customer lead, customer order workflow information and other types of information obtained from customers, and partners generated using the electronic services network system, and wherein the information repository includes a plurality of electronic data sets comprising Customer Leads, Customer Orders, Customer Profiles, Service Address Profiles, Service Work Orders, Market Data, Provider Profiles, Technician Profiles, Service Appointments, Customer Contacts, Work Items, Work Assignments and Business Rules; and
a plurality of functional engines to provide functionality to select, schedule, confirm, purchase, invoice, bill and settle orders for goods or services,
wherein the plurality of functional engines includes Workflow, Preference and Personalization, Service-Fulfillment Tracking, Factor-based pricing, Real-Time Scheduling, Billing and Credit Card processing, Need-Solution Identification, Service Provider Network, Provider Selection and Assignment, Event notification, Service Appointment Calendaring, Resource Management, Service Route Calculation, Invoicing Settlement and Renewal Engines,
wherein the plurality of functional engines help provide enterprise-wide visibility and management of business processes for internal and external partners and wherein the plurality of functional engines enforce the Business Rules to provide a uniform quality-of-service ("QoS").

11. The electronic services network system of claim 1 wherein the Needs-Solution Identification engine provides an expert system for identifying specific service needs for a customer.

12. The electronic services network system of claim 1 wherein the Service Route Calculation engine provides intelligent routing to schedule and route service appointments and helps maximize the efficiency of service provider resources by minimizing travel to and from work sites.

13. The electronic services network system of claim 1 wherein the Factor-based pricing engine determines a price of a service at a time of the sale of services based on a plurality of pricing factors known at that time, wherein the pricing factors include a combination of dynamic and static pricing factors including regional pricing differences, market pricing differences, regulation pricing differences, tax pricing differences, partner pricing, promotion code pricing differences or co-branded site pricing.

14. The electronic services network system of claim 1 wherein the Resource Management engine enables service providers to define and manage service related resources including, individual service provider workers, service provider equipment that can be scheduled, crews of services workers and service provider sales personnel and provides a high level view of service workers' skills, work preferences, available services and timeslots.

15. The electronic services network system of claim 1 wherein the Workflow engine provides access to Technician Profiles that include information about individual service technicians that provide specialty services including applying extermination chemicals, applying liquid fertilizers and applying lawn chemicals.

* * * * *